US012094418B2

(12) United States Patent
Jung

(10) Patent No.: US 12,094,418 B2
(45) Date of Patent: Sep. 17, 2024

(54) DISPLAY PANEL AND DISPLAY APPARATUS INCLUDING THE SAME

(71) Applicant: Samsung Display Co., Ltd., Yongin-si (KR)

(72) Inventor: Keuntae Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/132,935

(22) Filed: Apr. 10, 2023

(65) Prior Publication Data

US 2023/0245622 A1 Aug. 3, 2023

Related U.S. Application Data

(63) Continuation of application No. 17/332,923, filed on May 27, 2021, now Pat. No. 11,651,734.

(30) Foreign Application Priority Data

Dec. 29, 2020 (KR) ........................ 10-2020-0186773

(51) Int. Cl.
*G09G 3/3258* (2016.01)
*G09G 3/3291* (2016.01)

(52) U.S. Cl.
CPC ......... *G09G 3/3258* (2013.01); *G09G 3/3291* (2013.01); *G09G 2310/0272* (2013.01)

(58) Field of Classification Search
CPC ........................... G09G 3/3258; G09G 3/3291
See application file for complete search history.

(56) References Cited

U.S. PATENT DOCUMENTS 10,186,191 B2 1/2019 Kang et al.
10,290,694 B2 5/2019 Xian et al.
(Continued)

FOREIGN PATENT DOCUMENTS

CN 107742502 2/2018
CN 107749247 3/2018
(Continued)

OTHER PUBLICATIONS

Non-Final Office Action mailed Dec. 9, 2021, in U.S. Appl. No. 17/332,923.
(Continued)

*Primary Examiner* — Sardis F Azongha
(74) *Attorney, Agent, or Firm* — KILE PARK REED & HOUTTEMAN PLLC

(57) ABSTRACT

A display panel with an extended display area, and a display apparatus including the display panel, wherein the display panel includes: a substrate in which a display area including a component area and a main area, and a peripheral area outside the display area are defined; a first main pixel circuit in the main area; a main display element in the main area connected to the first main pixel circuit; a first auxiliary pixel circuit in the peripheral area; a first auxiliary display element in the component area, connected to the first auxiliary pixel circuit; a pad unit in the peripheral area including a first main data pad and a first auxiliary data pad; a first main data line connecting the main data pad to the first main pixel circuit; and a first auxiliary data line connecting the first auxiliary data pad to the first auxiliary pixel circuit.

9 Claims, 10 Drawing Sheets

(56) References Cited

U.S. PATENT DOCUMENTS

| | | | |
|---|---|---|---|
| 10,707,281 B2 | 7/2020 | Kuo et al. | |
| 10,713,989 B2 | 7/2020 | Chen et al. | |
| 11,404,512 B2 * | 8/2022 | Kim | H10K 59/17 |
| 2020/0098313 A1 | 3/2020 | Bian | |
| 2020/0286972 A1 | 9/2020 | Seo et al. | |
| 2021/0193758 A1 | 6/2021 | Choi et al. | |
| 2022/0093682 A1 * | 3/2022 | Chang | H10K 59/121 |

FOREIGN PATENT DOCUMENTS

| | | |
|---|---|---|
| CN | 110288945 | 9/2019 |
| CN | 111028692 | 4/2020 |
| CN | 111063719 | 4/2020 |

OTHER PUBLICATIONS

Final Office Action mailed May 26, 2022, in U.S. Appl. No. 17/332,923.

Non-Final Office Action mailed Aug. 8, 2022, in U.S. Appl. No. 17/332,923.

Notice of Allowance issued Jan. 6, 2023, in U.S. Appl. No. 17/332,923.

* cited by examiner

DISPLAY PANEL AND DISPLAY APPARATUS INCLUDING THE SAME

CROSS-REFERENCE TO RELATED APPLICATIONS

This application is a Continuation of U.S. application Ser. No. 17/332,923, filed on May 27, 2021, which claims priority from and the benefit of Korean Patent Application No. 10-2020-0186773, filed on Dec. 29, 2020, each of which is hereby incorporated by reference for all purposes as if fully set forth herein.

BACKGROUND

Field

Embodiments of the invention relate generally to a display panel and a display apparatus including the display panel, and more particularly, to a display panel including an extended display area to display an image even in an area in which a component that is an electronic element is arranged, and a display apparatus including the display panel.

Discussion of the Background

Display apparatuses visually display data. Display apparatuses may be used as displays of small products such as mobile phones, or may be used as displays of large products such as televisions.

The display apparatus includes a substrate that is divided into a display area and a peripheral area, and in the display area, a gate line and a data line are mutually insulated from each other. A plurality of pixel areas are defined in the display area, and pixels arranged in each of the plurality of pixel areas receive electrical signals from the gate line and the data line crossing each other and display an image to the outside. Each of the pixel areas includes a thin-film transistor and a pixel electrode electrically connected to the thin-film transistor, and an opposite electrode is commonly provided in the pixel areas. The peripheral area may include various lines for transmitting an electrical signal to pixels in the display area, a gate driving unit, pads to which the data driving unit and a controller may be connected, and the like.

Recently, usage of display apparatuses has diversified. In addition, as display apparatuses have become thinner and lighter, a use range thereof has steadily expanded.

As display apparatuses are used in various ways, there may be various ways to design shapes of display apparatuses, and also, functions that may be combined with or linked to display apparatuses have increased.

The above information disclosed in this Background section is only for understanding of the background of the inventive concepts, and, therefore, it may contain information that does not constitute prior art.

SUMMARY

Devices constructed according to illustrative implementations of the invention are capable of providing a display panel with an extended display area to display an image even in an area in which a component that is an electronic element is arranged, and a display apparatus including the display panel. However, this objective is an example and does not limit the scope of the inventive concepts.

Additional features of the inventive concepts will be set forth in the description that follows and, in part, will be apparent from the description, or may be learned by practice of the inventive concepts.

According to an embodiment, a display panel includes a substrate with a display area including a component area and a main area at least partially surrounding the component area, and a peripheral area disposed outside the display area, a first main pixel circuit in the main area, a first main display element arranged in the main area and electrically connected to the first main pixel circuit, a first auxiliary pixel circuit disposed in the peripheral area, a first auxiliary display element arranged in the component area, electrically connected to the first auxiliary pixel circuit, and arranged in a same column as the first main display element, a pad unit arranged in the peripheral area and including a first main data pad and a first auxiliary data pad, a first main data line extending in a first direction and connecting the first main data pad to the first main pixel circuit, and configured to transmit a first data signal, and a first auxiliary data line extending in the first direction and connecting the first auxiliary data pad to the first auxiliary pixel circuit, and configured to transmit the first data signal.

The pad unit may further include a second main data pad, and the display panel may further include a second main pixel circuit disposed in the main area, a second main display element arranged in the main area, electrically connected to the second main pixel circuit, and arranged in a different column from a column in which the first main display element is arranged, and a second main data line extending in the first direction and connecting the second main data pad to the second main pixel circuit, and configured to transmit a second data signal.

The first main pixel circuit and the first main display element may overlap each other in plan view, and the second main pixel circuit and the second display element may overlap each other in plan view.

A second portion of the second main data line overlapping the main area may be longer than a first portion of the first main data line overlapping the main area.

The pad unit may further include a second auxiliary data pad, the display panel may further include a second auxiliary pixel circuit disposed in the peripheral area, a second auxiliary display element arranged in the component area, electrically connected to the second auxiliary pixel circuit, and arranged in a same column as the second main display element, and a second auxiliary data line extending in the first direction and connecting the second auxiliary data pad to the second auxiliary pixel circuit, and configured to transmit the second data signal, and the display area is located between the first auxiliary pixel circuit and the second auxiliary pixel circuit.

The display panel may further include a third main pixel circuit and a fourth main pixel circuit disposed in the main area, a third main display element arranged in the main area, electrically connected to the third main pixel circuit, and arranged in a same row as the first auxiliary display element, a fourth main display element arranged in the main area, electrically connected to the fourth main pixel circuit, and arranged in a same row as the second auxiliary display element, a first gate driving circuit and a second gate driving circuit disposed in the peripheral area, a first gate line extending in a second direction and connecting the first driving circuit to the third main pixel circuit and the first auxiliary pixel circuit, and a second gate line extending in the second direction and connecting the second gate driving circuit to the fourth main pixel circuit and the second auxiliary pixel circuit, and the display area may be located between the first gate driving circuit and the second gate driving circuit.

The first gate line and the second gate line arranged on a same row may be spaced apart from each other in the second direction by the component area.

The second main display element and the first auxiliary display element may be arranged in a same row, and the display panel may further include a first gate driving circuit disposed in the peripheral area, and a first gate line extending in a second direction and connecting the first gate driving circuit to the second main pixel circuit and the first auxiliary pixel circuit.

The display panel may further include a third auxiliary pixel circuit arranged in the peripheral area, and arranged in a same row as the first auxiliary pixel circuit and connected to the first gate line, and a third auxiliary display element arranged in the component area, electrically connected to the third auxiliary pixel circuit, and arranged in a same row as the first auxiliary display element.

The display panel may further include a third auxiliary pixel circuit arranged in the peripheral area, and arranged in a same column as the first auxiliary pixel circuit and connected to the first auxiliary data line, and a third auxiliary display element arranged in the component area, electrically connected to the third auxiliary pixel circuit, and arranged in a same column as the first auxiliary display element.

The display panel may further include an electrode connection line connecting the first auxiliary display element and the first auxiliary pixel circuit to each other, and including a first electrode connection line and a second electrode connection line including different materials from each other.

The first electrode connection line may be arranged in the peripheral area and includes a conductive material, and the second electrode connection line may be arranged in the component area and includes a transparent conductive oxide.

According to another embodiment, a display panel includes a substrate with a display area including a component area and a main area at least partially surrounding the component area, and a peripheral area disposed outside the display area, a first main pixel circuit disposed in the main area, a first main display element arranged in the main area and electrically connected to the first main pixel circuit, a first auxiliary pixel circuit disposed in the peripheral area, a first auxiliary display element arranged in the component area, electrically connected to the first auxiliary pixel circuit, and arranged in a same row as the first main display element, a first gate driving circuit disposed in the peripheral area, and a first gate line extending in a first direction and connecting the first main pixel circuit and the first auxiliary pixel circuit to the first gate driving circuit, and the first auxiliary pixel circuit is arranged between the display area and the first gate driving circuit.

The display panel may further include a second main pixel circuit disposed in the main area, a second main display element arranged in the main area and electric ally connected to the second main pixel circuit, a second auxiliary pixel circuit disposed in the peripheral area, a second auxiliary display element arranged in the component area, electrically connected to the second auxiliary pixel circuit, and arranged in a same row as the second main display element, a second gate driving circuit disposed in the peripheral area, and a second gate line extending in the first direction and connecting the second main pixel circuit and the second auxiliary pixel circuit to the second gate driving circuit, and the display area may be located between the first gate driving circuit and the second gate driving circuit, and the second auxiliary pixel circuit may be arranged between the display area and the second gate driving circuit.

The first gate line and the second gate line arranged in a same row may be spaced apart from each other in the first direction by the component area.

The display panel may further include a third main pixel circuit and a fourth main pixel circuit disposed in the main area, a third main display element arranged in the main area, electrically connected to the third main pixel circuit, and arranged in a same column as the first auxiliary display element, a fourth main display element arranged in the main area, electrically connected to the fourth main pixel circuit, and arranged in a same column as the second auxiliary display element, a first main data line and a second main data line connected to the third main pixel circuit and the fourth main pixel circuit, respectively, a first auxiliary data line and a second auxiliary data line connected to the first auxiliary pixel circuit and the second auxiliary pixel circuit, respectively, a first data connection line connecting the first main data line and the first auxiliary data line to each other, and a second data connection line connecting the second main data line and the second auxiliary data line to each other.

According to another embodiment, a display apparatus may include a first main pixel circuit and a first auxiliary pixel circuit, a first main display element electrically connected to the first main pixel circuit and overlapping the first main pixel circuit in plan view, a first auxiliary display element electrically connected to the first auxiliary pixel circuit and arranged in a same column as the first main display element, a pad unit including a first main data pad and a first auxiliary data pad, a display driving circuit configured to transmit a first data signal to each of the first main data pad and the first auxiliary data pad so that the first main pixel circuit and the first auxiliary pixel circuit are driven, a first main data line extending in a first direction and connecting the first main data pad to the first main pixel circuit, and a first auxiliary data line extending in the first direction and connecting the first auxiliary data pad to the first auxiliary pixel circuit.

The display driving circuit may include an electrode unit including a first main data electrode and a first auxiliary data electrode, and a data driving circuit configured to output the first data signal to each of the first main data electrode and the first auxiliary data electrode.

The pad unit may further include a second main data pad, the display apparatus may further include a second main pixel circuit, a second main display element electrically connected to the second main pixel circuit, overlapping the second main pixel circuit, and arranged in a same row as the first main display element, and a second main data line extending in the first direction and connecting the second main data pad to the second main pixel circuit, and the display driving circuit may be configured to transmit a second data signal to the second main data pad so that the second main pixel circuit is driven.

The display apparatus may further include a printed circuit board including lines for connecting the first main data electrode and the first auxiliary data electrode to the first main data pad and the first auxiliary data pad, respectively, the display driving circuit may be mounted on the printed circuit board, and the printed circuit board may be mounted on the pad unit.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
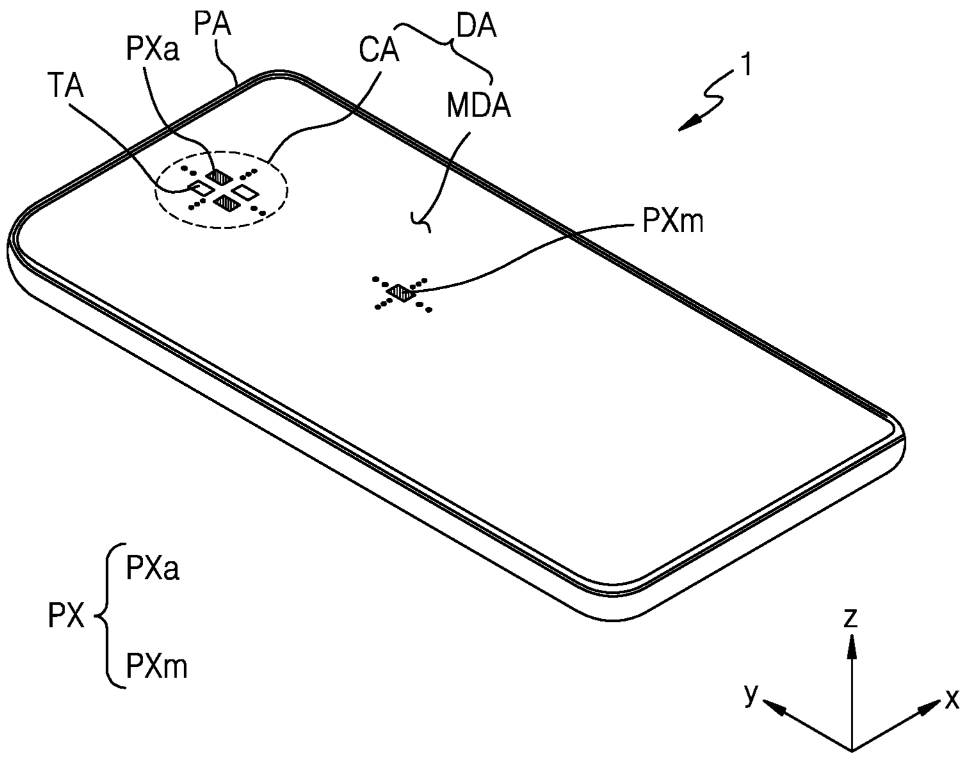
FIG. 1 is a perspective view schematically illustrating a display apparatus according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

In the following examples, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

As used herein, the term "in plan view" relates to a view of a plane defined by the x-axis and y-axis as seen from along the z-axis.

FIG. 1 is a perspective view schematically illustrating a display apparatus 1 according to an embodiment.

Referring to FIG. 1, the display apparatus 1 may include a display area DA and a peripheral area PA outside the display area DA. The display area DA may include a component area CA and a main area MDA at least partially surrounding the component area CA. The component area CA and the main area MDA may display an image individually or together. The peripheral area PA may include a type of non-display area in which display elements are not arranged. The display area DA may be entirely surrounded by the peripheral area PA.

In FIG. 1, one component area CA is located in the main area MDA. In another embodiment, the display apparatus 1 may include two or more component areas CA, and shapes and sizes of the plurality of component areas CA may be different from each other. When the component area CA is viewed from a direction approximately perpendicular to an upper surface of the display apparatus 1 (e.g., in plan view), the component area CA may have various shapes, such as but not limited to a circular shape, an ellipse shape, a polygonal shape, such as a rectangular shape, a star shape, or a diamond shape. In addition, in FIG. 1, the component area CA is arranged at an upper center (in a +y direction) of the main area MDA having an approximately quadrilateral shape when viewed from a direction approximately perpendicular to the upper surface of the display apparatus 1. However, the component area CA is not limited thereto and may also be arranged at one side of the main area MDA having a quadrilateral shape, for example, at the upper right side or the upper left side thereof.

The display apparatus 1 may provide an image using a plurality of pixels PX arranged in the display area DA. The display apparatus 1 may provide an image using a plurality of main pixels PXm arranged in the main area MDA and a plurality of auxiliary pixels PXa arranged in the component area CA. Each of the plurality of main pixels PXm and the plurality of auxiliary pixels PXa may include a display element. Each of the plurality of main pixels PXm and the plurality of auxiliary pixels PXa may include a display element such as an organic light-emitting diode (OLED). For example, each of the pixels PX may emit red, green, blue, or white light from the organic light-emitting diode (OLED). In the following description, each of the pixels PX means sub-pixels emitting light of different colors, and each of the pixels PX may include one from among, for example, a red sub-pixel, a green sub-pixel, and a blue sub-pixel.

Figure 2:
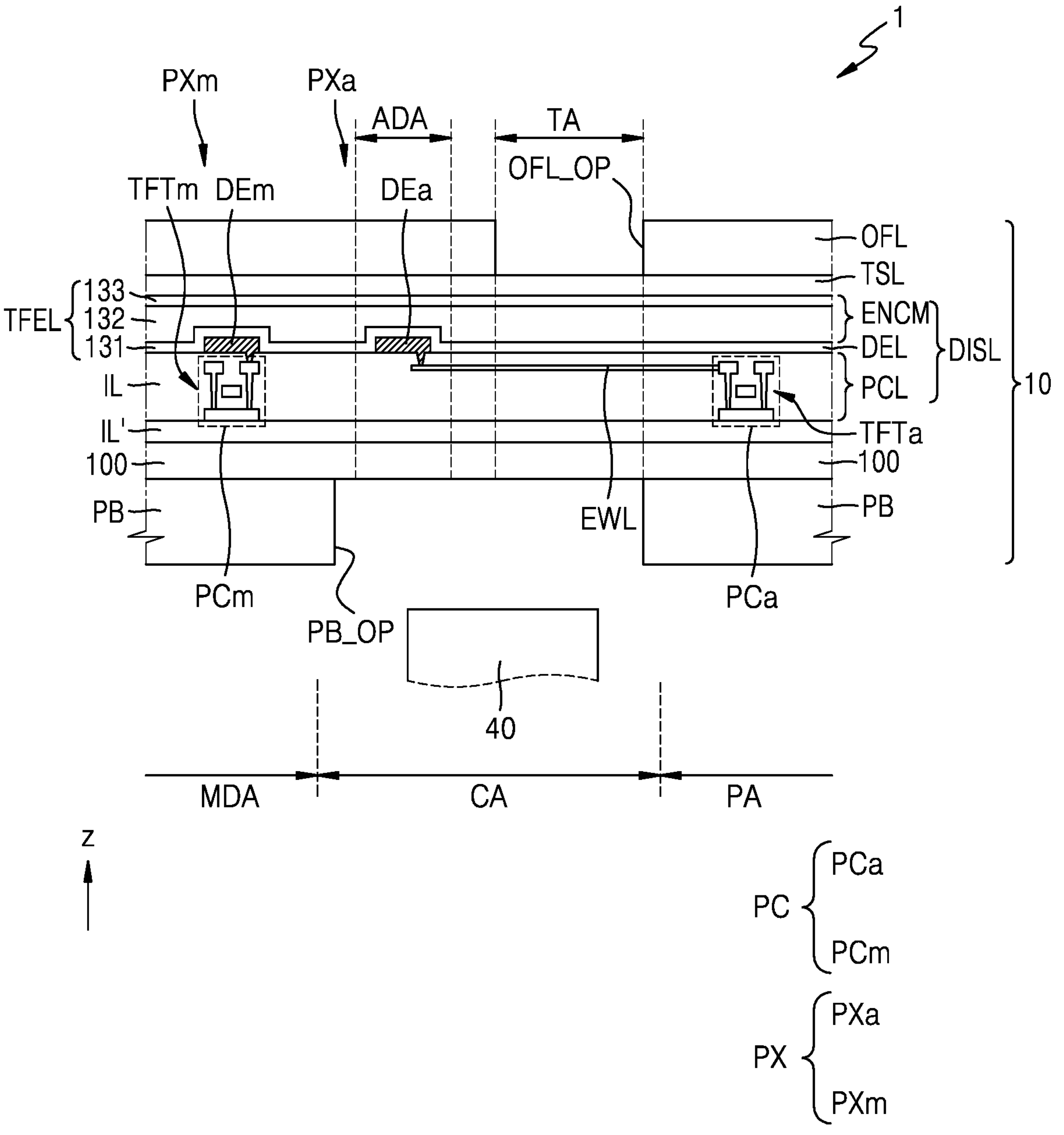
FIG. 2 is a cross-sectional view schematically illustrating part of a display apparatus according to an embodiment.

In the component area CA, as shown in FIG. 2 to be described later below, a component 40, which is an electronic element, may be arranged below a display panel to correspond to the component area CA. The component 40 may include a camera using infrared or visible light, and may include an imaging device. In some embodiments, the component 40 may include a solar cell, a flash, an illuminance sensor, a proximity sensor, or an iris sensor. In some embodiments, the component 40 may have a function of receiving sound. To minimize the restrictions on functions of the component 40, the component area CA may include a transmission area TA that transmits light and/or sound output from the component 40 to the outside or progressing toward the component 40 from the outside. In a case of a display panel and a display apparatus including the display panel according to an embodiment, when light is transmitted through the component area CA, a light transmittance may be about 10% or more, for example, about 40% or more, about 25% or more, about 50% or more, about 85% or more, or about 90% or more.

The plurality of auxiliary pixels PXa may be arranged in the component area CA. The plurality of auxiliary pixels PXa may emit light and provide an image. An image displayed in the component area CA is an auxiliary image, which may have a lower resolution than an image displayed in the main area MDA. In other words, the component area CA includes the transmission area TA that may transmit light and sound, and when no pixel is arranged in the transmission area TA, a number of auxiliary pixels PXa arranged per unit area in the transmission area TA may be less than a number of main pixels PXm arranged per unit area in the main area MDA.

FIG. 2 is a cross-sectional view schematically illustrating part of a display apparatus 1 according to an embodiment.

Referring to FIG. 2, the display apparatus 1 may include a display panel 10 and the component 40 overlapping the display panel 10 in plan view. A cover window (not shown) for protecting the display panel 10 may be further arranged on the display panel 10.

The display panel 10 includes a component area CA that is an area overlapping the component 40, and a main area MDA in which a main image is displayed. The display panel 10 may include a substrate 100, a display layer DISL on the substrate 100, a touch screen layer TSL, an optical functional layer OFL, and a panel protection member PB below the substrate 100.

The display layer DISL may include a circuit layer PCL including a main thin-film transistor TFTm and an auxiliary thin-film transistor TFTa, a display element layer DEL including a main display element DEm and an auxiliary display element DEa, and an encapsulation member ENCM such as a thin-film encapsulation layer TFEL or an encapsulation substrate (not shown). Insulating layers IL and IL' may be respectively arranged in the display layer DISL and between the substrate 100 and the display layer DISL.

The substrate 100 may include an insulating material, such as glass, quartz, and polymer resins. The substrate 100 may include a rigid substrate or a flexible substrate that is bendable, foldable, or rollable.

A main pixel circuit PCm and a main display element DEm connected thereto may be arranged in the main area MDA of the display panel 10. The main pixel circuit PCm may include at least one main thin-film transistor TFTm, and may control emission of the main display element DEm. A main pixel PXm may be implemented by emission of the main display element DEm. The main pixel circuit PCm and the main display element DEm may overlap each other in plan view.

An auxiliary display element DEa may be arranged in the component area CA of the display panel 10 to implement an auxiliary pixel PXa. In the present embodiment, an auxiliary pixel circuit PCa configured to drive the auxiliary display element DEa may not be arranged in the component area CA, but may be arranged in a peripheral area PA that is a non-display area. In another embodiment, the auxiliary pixel circuit PCa may be arranged in part of the main area MDA, or may be arranged between the main area MDA and the component area CA, and various modifications are possible. In other words, the auxiliary pixel circuit PCa may be arranged not to overlap the auxiliary display element DEa.

The auxiliary pixel circuit PCa includes at least one auxiliary thin-film transistor TFTa and may be electrically connected to the auxiliary display element DEa through an electrode connection line EWL. The electrode connection line EWL may include a transparent conductive material. The auxiliary pixel circuit PCa may control emission of the auxiliary display element DEa. The auxiliary pixel PXa may be implemented by emission of the auxiliary display element DEa. An area of the component area CA in which the auxiliary display element DEa is arranged may be referred to as an auxiliary display area ADA.

In addition, an area of the component area CA in which the auxiliary display element DEa is not arranged may be referred to as a transmission area TA. The transmission area TA may be an area that light/signals emitted from or incident on the component 40 arranged to correspond to the component area CA may transmit. The auxiliary display area ADA and the transmission area TA may be alternately arranged in the component area CA. The electrode connection line EWL connecting the auxiliary pixel circuit PCa and the auxiliary display element DEa to each other may be arranged in the transmission area TA. The electrode connection line EWL may include a transparent conductive material having a high transmittance, and thus, a transmittance of the transmission area TA may be secured, even if the electrode connection line EWL is arranged in the transmission area TA.

In the present embodiment, the auxiliary pixel circuit PCa is not arranged in the component area CA, and thus, an area of the transmission area TA may be secured and the light transmittance of the component area CA may be further improved.

The display element layer DEL may be covered with a thin-film encapsulation layer TFEL or the encapsulation substrate. In some embodiments, the thin-film encapsulation layer TFEL may include at least one inorganic encapsulation layer and at least one organic encapsulation layer as shown in FIG. 2. In an embodiment, the thin-film encapsulation layer TFEL may include a first inorganic encapsulation layer 131, a second inorganic encapsulation layer 133, and an organic encapsulation layer 132 therebetween.

The first inorganic encapsulation layer 131 and the second inorganic encapsulation layer 133 may each include one or more inorganic insulating materials such as silicon oxide ($SiO_2$), silicon nitride ($SiN_X$), silicon oxynitride ($SiO_XN_Y$), aluminum oxide ($Al_2O_3$), titanium oxide ($TiO_2$), tantalum oxide ($Ta_2O_5$), and hafnium oxide ($HfO_2$), or zinc oxide (ZnO), and may be formed by chemical vapor deposition (CVD) or the like. The organic encapsulation layer 132 may include a polymer-based material. The polymer-based material may include silicon-based resin, acryl-based resin, epoxy-based resin, polyimide, polyethylene, and the like.

The first inorganic encapsulation layer 131, the organic encapsulation layer 132, and the second inorganic encapsulation layer 133 may be integrally formed as a single body to cover the main area MDA and the component area CA.

When the display element layer DEL is sealed with the encapsulation substrate (not shown), the encapsulation substrate may be arranged to face the substrate 100 with the display element layer DEL therebetween. There may be a gap between the encapsulation substrate and the display element layer DEL. The encapsulation substrate may include glass. A sealant including frit or the like is arranged between the substrate 100 and the encapsulation substrate, and the sealant may be arranged in the peripheral area PA described above. The sealant arranged in the peripheral area PA may surround the display area DA and prevent the penetration of moisture through a side surface of the display area DA.

The touch screen layer TSL may obtain coordinate information based on an external input, for example, a touch event. The touch screen layer TSL may include a touch electrode and touch lines connected to the touch electrode. The touch screen layer TSL may sense an external input based on a self-capacitance method or a mutual capacitance method.

The touch screen layer TSL may be formed on the thin-film encapsulation layer TFEL. In some embodiments, the touch screen layer TSL may be formed on a touch substrate separately, and then coupled onto the thin-film encapsulation layer TFEL through an adhesive layer such as an optically clear adhesive (OCA). In an embodiment, the touch screen layer TSL may be formed directly above the thin-film encapsulation layer TFEL, and in this case, an adhesive layer may not be between the touch screen layer TSL and the thin-film encapsulation layer TFEL.

The optical functional layer OFL may include an anti-reflection layer. The anti-reflection layer may reduce a reflectance of light (external light) incident toward the display apparatus 1 from the outside.

In some embodiments, the optical functional layer OFL may include a polarizing film. The optical functional layer OFL may include an opening OFL_OP corresponding to the transmission area TA. Thus, the light transmittance of the transmission area TA may be significantly improved. The opening OFL_OP may be filled with a transparent material such as the optically clear resin (OCR).

In some embodiments, the optical functional layer OFL may include a filter plate including a black matrix and color filters.

The panel protection member PB may be attached to a lower portion of the substrate 100 and support and protect the substrate 100. The panel protection member PB may include an opening PB_OP corresponding to the component area CA. The panel protection member PB includes the opening PB_OP, and thus, a light transmittance of the component area CA may be improved. The panel protection member PB may include polyethylene terephthalate (PET) or polyimide (PI).

An area of the component area CA may be greater than an area in which the component 40 is arranged. Thus, an opening of the opening PB_OP provided in the panel protection member PB may not correspond to the area of the component 40.

In addition, a plurality of components 40 may be arranged in the component area CA. The plurality of components 40 may have different functions from each other. For example, the plurality of components 40 may include at least two of a camera (an imaging device), a solar cell, a flash, a proximity sensor, an illuminance sensor, and an iris sensor.

Although not shown in FIG. 2, a bottom metal layer may be arranged below the auxiliary display element DEa of the component area CA. In other words, the display apparatus 1 may include the bottom metal layer.

The bottom metal layer may overlap the auxiliary display element DEa between the substrate 100 and the auxiliary display element DEa. The bottom metal layer may prevent external light from reaching the auxiliary display element DEa. Meanwhile, the bottom metal layer is formed to correspond to the entire component area CA and may include a lower-hole corresponding to the transmission area TA. In this case, the lower-hole may be provided in various shapes such as a polygonal, a circular, or an amorphous shape, and adjust the diffraction characteristic of external light.

Figure 3:
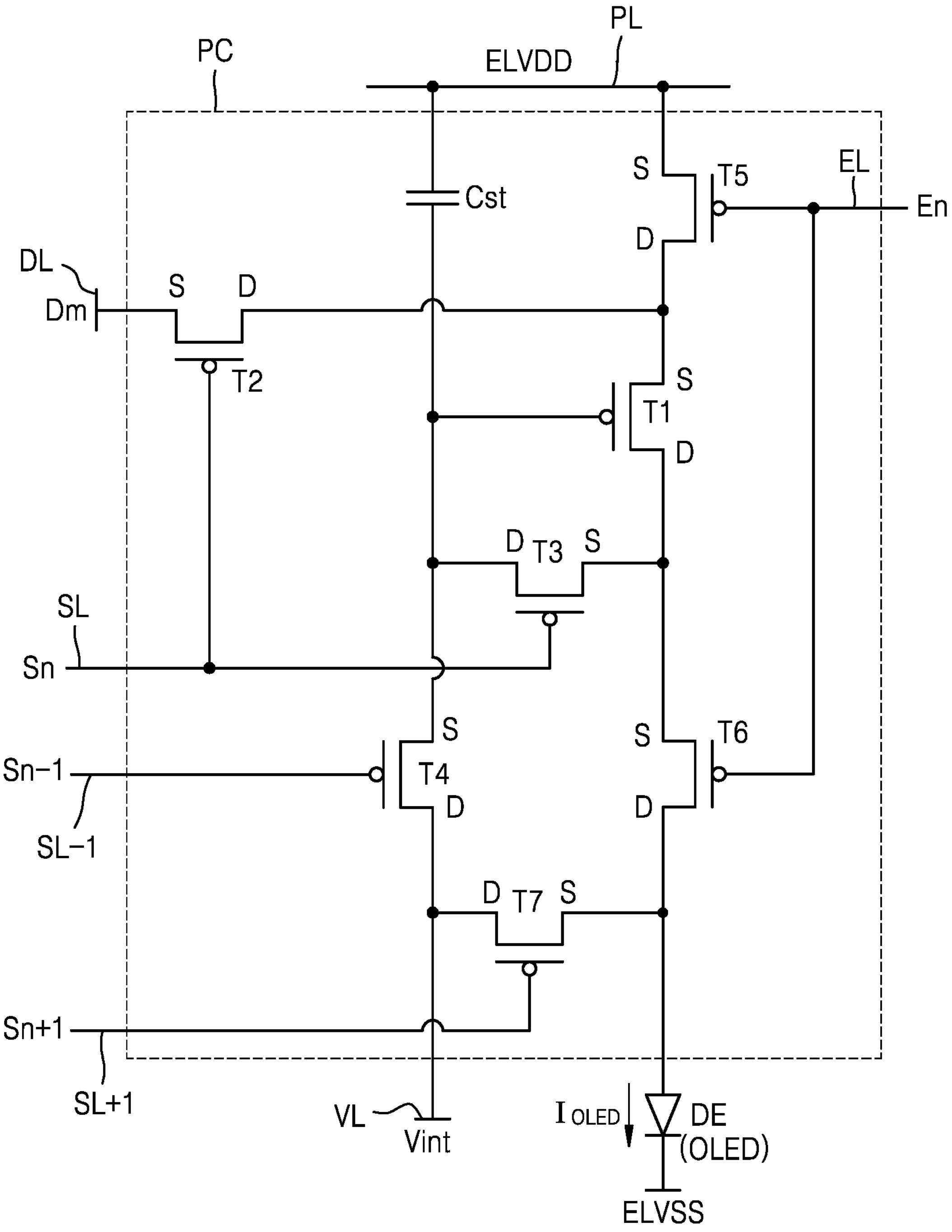
FIG. 3 is an equivalent circuit diagram schematically illustrating a pixel circuit that may be applicable to a display apparatus, according to an embodiment.

FIG. 3 is an equivalent circuit diagram schematically illustrating a pixel circuit PC that may be applicable to a display apparatus, according to an embodiment.

Referring to FIG. 3, the pixel circuit PC may be connected to a scan line SL, a data line DL, a display element DE, and the like. For example, the display element DE may include an organic light-emitting diode OLED.

The pixel circuit PC may include first to seventh thin-film transistors T1 to T7 and a storage capacitor Cst. The first to seventh thin-film transistors T1 to T7 and the storage capacitor Cst are connected to first to third scan lines SL, SL−1, and SL+1 for respectively transmitting first to third scan signals Sn, Sn−1, and Sn+1, the data line DL for transmitting a data voltage Dm, an emission control line EL for transmitting an emission control signal En, a driving voltage line PL for transmitting a driving voltage ELVDD, an initialization voltage line VL for transmitting an initialization voltage Vint, and a common electrode to which a common voltage ELVSS is applied.

The first thin-film transistor T1 may be a driving transistor in which a magnitude of a drain current thereof is determined according to a gate-source voltage, and the second to seventh thin-film transistors T2 to T7 may be switching transistors that are turned on/off according to the gate-source voltage, substantially, the gate voltage.

The first thin-film transistor T1 may be referred to as a driving thin-film transistor, the second thin-film transistor T2 may be referred to as a scan thin-film transistor, the third thin-film transistor T3 may be referred to as a compensation thin-film transistor, the fourth thin-film transistor T4 may be referred to as a gate initialization thin-film transistor, the fifth thin-film transistor T5 may be referred to as a first emission control thin-film transistor, the sixth thin-film transistor T6 may be referred to as a second emission control thin-film transistor, and the seventh thin-film transistor T7 may be referred to as an anode initialization thin-film transistor.

The storage capacitor Cst is connected between the driving voltage line PL and a driving gate of the driving thin-film transistor T1. The storage capacitor Cst may include an upper electrode connected to the driving voltage line PL, and a lower electrode connected to the driving gate of the driving thin-film transistor T1.

The driving thin-film transistor T1 may control, according to the gate-source voltage, a magnitude of a driving current $I_{OLED}$ that flows from the driving voltage line PL to the organic light-emitting diode OLED. The driving thin-film transistor T1 may include a driving gate connected to the lower electrode of the storage capacitor Cst, a driving source connected to the driving voltage line PL through the first emission control thin-film transistor T5, and a driving drain connected to the organic light-emitting diode OLED through the second emission control thin-film transistor T6.

The driving thin-film transistor T1 may output the driving current $I_{OLED}$ to the organic light-emitting diode OLED according to the gate-source voltage. The magnitude of the driving current $I_{OLED}$ is determined based on a voltage difference between the gate-source voltage and a threshold voltage of the driving thin-film transistor T1. The organic light-emitting diode OLED receives the driving current $I_{OLED}$ from the driving thin-film transistor T1 and may emit light of a luminance according to the magnitude of the driving current $I_{OLED}$.

The scan thin-film transistor T2 transmits the data voltage Dm to the driving source of the driving thin-film transistor T1 in response to the first scan signal Sn. The scan thin-film transistor T2 may include a scan gate connected to the first scan line SL, a scan source connected to the data line DL, and a scan drain connected to the driving source of the driving thin-film transistor T1.

The compensation thin-film transistor T3 is connected in series between the driving drain and the driving gate of the driving thin-film transistor T1, and connects the driving drain and the driving gate of the driving thin-film transistor T1 in response to the first scan signal Sn. The compensation thin-film transistor T3 may include a compensation gate connected to the first scan line SL, a compensation source connected to the driving drain of the driving thin-film transistor T1, and a compensation drain connected to the driving gate of the driving thin-film transistor T1. In FIG. 3, the compensation thin-film transistor T3 includes one thin-film transistor, but the compensation thin-film transistor T3 may include two thin-film transistors connected in series to each other.

The gate initialization thin-film transistor T4 applies the initialization voltage Vint to the driving gate of the driving thin-film transistor T1 in response to the second scan signal Sn−1. The gate initialization thin-film transistor T4 may include a first initialization gate connected to the second scan line SL−1, a first initialization source connected to the driving gate of the driving thin-film transistor T1, and a first initialization drain connected to the initialization voltage line VL. In FIG. 3, the gate initialization thin-film transistor T4 includes one thin-film transistor, but the gate initialization thin-film transistor T4 may include two thin-film transistors connected in series to each other.

The anode initialization thin-film transistor T7 applies the initialization voltage Vint to the organic light-emitting diode OLED in response to the third scan signal Sn+1. The anode initialization thin-film transistor T7 may include a second initialization gate connected to the third scan line SL+1, a second initialization source connected to an anode of the organic light-emitting diode OLED, and a second initialization drain connected to the initialization voltage line VL.

The first emission control thin-film transistor T5 may connect the driving voltage line PL and the driving source of the driving thin-film transistor T1 to each other in response to the emission control signal En. The first emission control thin-film transistor T5 may include a first emission control gate connected to the emission control line EL, a first emission control source connected to the driving voltage line PL, and a first emission control drain connected to the driving source of the driving thin-film transistor T1.

The second emission control thin-film transistor T6 may connect the driving drain of the driving thin-film transistor T1 and the anode of the organic light-emitting diode OLED to each other in response to the emission control signal En. The second emission control thin-film transistor T6 may include a second emission control gate connected to the emission control line EL, a second emission control source connected to the driving drain of the driving thin-film transistor T1, and a second emission control drain connected to the anode of the organic light-emitting diode OLED.

The second scan signal Sn−1 may be substantially synchronized with the first scan signal Sn of a previous row. The third scan signal Sn+1 may be substantially synchronized with the first scan signal Sn. According to another example, the third scan signal Sn+1 may be substantially synchronized with the first scan signal Sn of a next row.

In the present embodiment, each of the first to seventh thin-film transistors T1 to T7 may include a semiconductor layer including silicon. For example, each of the first to seventh thin-film transistors T1 to T7 may include a semiconductor layer including low temperature polysilicon (LTPS). A polysilicon material has a high electron mobility (100 cm2/Vs), and thus has low energy power consumption and excellent reliability. In another example, each of the semiconductor layers of the first to seventh thin-film transistors T1 to T7 may include an oxide of at least one material selected from the group consisting of indium (In), gallium (Ga), tin (Sn), zirconium (Zr), vanadium (V), hafnium (Hf), cadmium (Cd), germanium (Ge), chrome (Cr), titanium (Ti), aluminum (Al), cesium (Cs), cerium (Cs), and zinc (Zn). For example, the semiconductor layers may include an InSnZnO (ITZO) semiconductor layer, an InGaZnO (IGZO) semiconductor layer, and the like. In another example, some semiconductor layers of the first to seventh thin-film transistors T1 to T7 may include LTPS, and some semiconductor layers may include IGZO and the like.

In the following description, a specific operation process of one pixel circuit PC of the display panel 10 and the organic light-emitting diode OLED that is the display element DE will be described in detail. As shown in FIG. 3, the first to seventh thin-film transistors T1 to T7 are p-type metal-oxide-semiconductor field-effect transistors (MOSFETs).

First, when a high-level emission control signal En is received, the first emission control thin-film transistor T5 and the second emission control thin-film transistor T6 are turned off, the driving thin-film transistor T1 stops outputting the driving current $I_{OLED}$, and the organic light-emitting diode OLED stops emitting light.

Thereafter, during a gate initialization period in which a low-level second scan signal Sn−1 is received, the gate initialization thin-film transistor T4 is turned off, and the initialization voltage Vint is applied to the driving gate of the driving thin-film transistor T1, that is, the lower electrode of the storage capacitor Cst. A voltage difference (ELVDD−Vint) between the driving voltage ELVDD and the initialization voltage Vint is stored in the storage capacitor Cst.

Thereafter, during a data writing period in which a low-level first scan signal Sn is received, the scan thin-film transistor T2 and the compensation thin-film transistor T3 are turned on, and the driving source of the driving thin-film transistor T1 receives the data voltage Dm. By the compensation thin-film transistor T3, the driving thin-film transistor T1 is diode-connected and biased in a forward direction. A gate voltage of the driving thin-film transistor T1 rises from the initialization voltage Vint. When the gate voltage of the driving thin-film transistor T1 is equal to a data compensation voltage (Dm−|Vth|), which is obtained by subtracting the data voltage Dm by a threshold voltage Vth, the driving thin-film transistor T1 is turned off, and the gate voltage of the driving thin-film transistor T1 stops rising. Accordingly, a voltage difference (ELVDD−Dm+|Vth|) between the driving voltage ELVDD and the data compensation voltage (Dm−|Vth|) is stored in the storage capacitor Cst.

In addition, during an anode initialization period in which a low-level third scan signal Sn+1 is received, the anode initialization thin-film transistor T7 is turned on, and the initialization voltage Vint is applied to the anode of the organic light-emitting diode OLED. By applying the initialization voltage Vint to the anode of the organic light-emitting diode OLED and making the organic light-emitting diode OLED completely non-emissive, in a next frame, the pixel circuit PC receives the data voltage Dm corresponding to black gradation, but a phenomenon in which the organic light-emitting diode OLED finely emits light may be eliminated.

The first scan signal Sn and the third scan signal Sn+1 may be substantially synchronized with each other, and in this case, the data writing period and the anode initialization period may denote a same period.

Thereafter, when a low-level emission control signal En is received, the first emission control thin-film transistor T5 and the second emission control thin-film transistor T6 may be turned on, a driving current $I_{OLED}$ corresponding to a voltage stored in the storage capacitor Cst, that is, a voltage (ELVDD−Dm) obtained by subtracting the source-gate voltage (ELVDD−Dm+|Vth|) of the driving thin-film transistor T1 by the threshold voltage (|Vth|) of the driving thin-film transistor T1, may be output, and the organic light-emitting diode OLED may emit light of a luminance corresponding to a magnitude of the driving current $I_{OLED}$.

In FIG. 3, the pixel circuit PC includes seven thin-film transistors and one storage capacitor, but the present disclosure is not limited thereto. For example, the pixel circuit PC may include two thin-film transistors and one storage capacitor, or may include three or more thin-film transistors and/or two or more storage capacitors.

Figure 4:
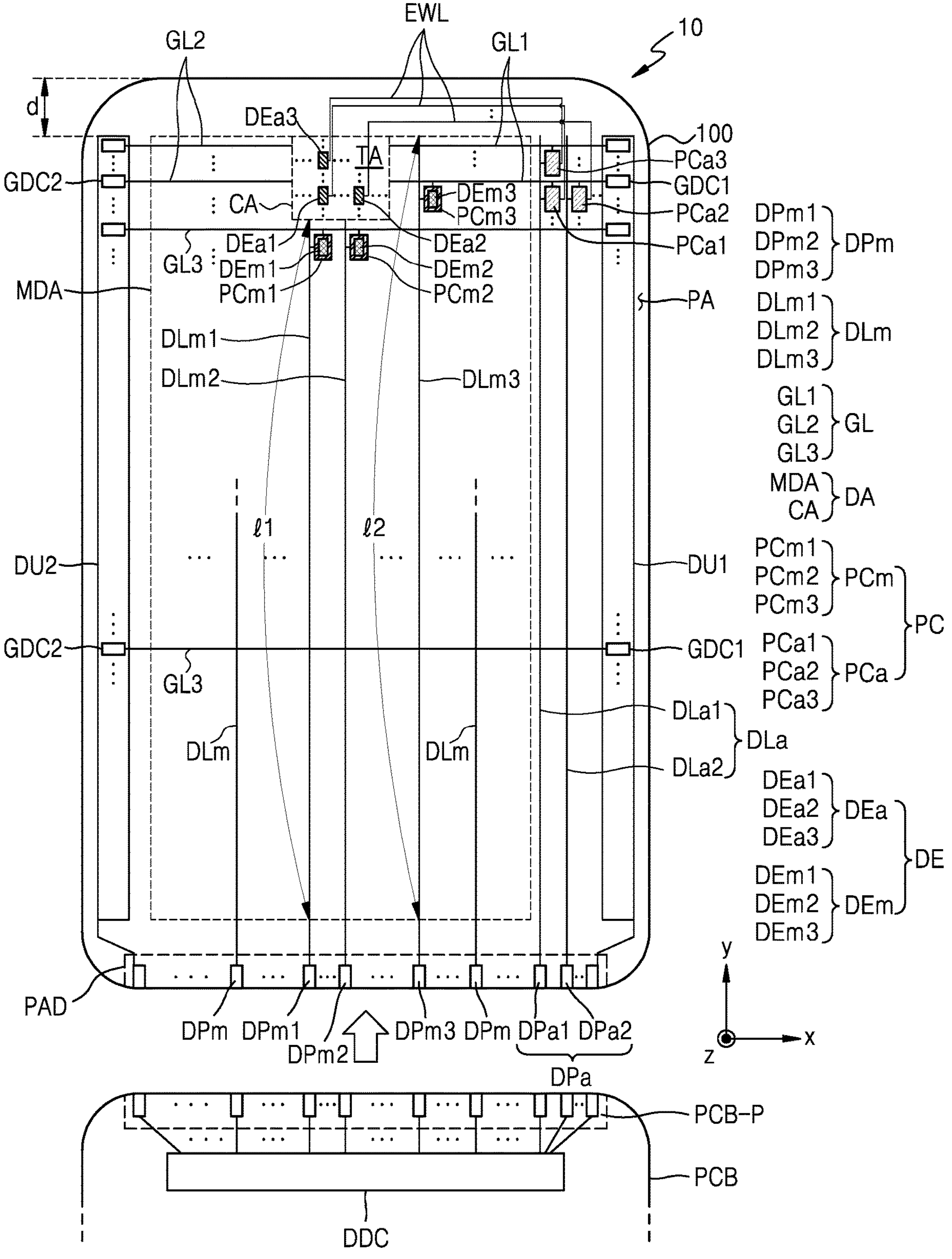
FIG. 4 is a plan view schematically illustrating a display apparatus according to an embodiment.

FIG. 4 is a plan view schematically illustrating a display apparatus according to an embodiment.

Referring to FIG. 4, various elements included in a display panel 10 may be arranged on a substrate 100. The substrate 100 may include (or may be defined by) a display area DA and a peripheral area PA surrounding the display area DA. The display area DA may include a main area MDA in which a main image is displayed, and a component area CA which includes a transmission area TA and in which an auxiliary image is displayed. The auxiliary image may form one full image together with the main image, or may form an image independent from the main image.

A plurality of main pixel circuits PCm and a plurality of main display elements DEm may be arranged in the main area MDA. For example, the main display element DEm may include an organic light-emitting diode OLED. The main pixel circuit PCm and the main display element DEm may be electrically connected to each other. In other words, the main display element DEm may be driven by the main pixel circuit PCm. The main pixel circuit PCm and the main display element DEm may overlap each other. The main area MDA may be covered with an encapsulation member and protected from ambient air, moisture, etc.

The component area CA may be located at one side of the main area MDA as described above, or may be arranged inside the display area DA and surrounded by the main area MDA. A plurality of auxiliary display elements DEa may be arranged in the component area CA. For example, the auxiliary display element DEa may include an organic light-emitting diode OLED. The component area CA may be covered with an encapsulation member and protected from ambient air, moisture, etc.

A plurality of auxiliary pixel circuits PCa may be arranged in the peripheral area PA. As shown in FIG. 4, the auxiliary pixel circuit PCa may be arranged in a portion of the peripheral area PA adjacent to a right side of the display area DA. For example, the auxiliary pixel circuit PCa may be arranged between a first driving unit DU1 to be described below, and the display area DA. In another example, the auxiliary pixel circuit PCa may be arranged in a portion of the peripheral area PA adjacent to a left side of the display area DA. For example, the auxiliary pixel circuit PCa may be arranged between a second driving unit DU2 to be described below, and the display area DA. In another example, each of the auxiliary pixel circuits PCa may be arranged between the first driving unit DU1 and the display area DA and between the second driving unit DU2 and the display area DA. This will be described later with reference to FIG. 7.

The auxiliary pixel circuit PCa and the auxiliary display element DEa may be electrically connected to each other. In other words, the auxiliary display element DEa may be driven by the auxiliary pixel circuit PCa. Unlike the main pixel circuit PCm and the main display element DEm, the auxiliary pixel circuit PCa and the auxiliary display element DEa are arranged in different areas from each other and thus may not overlap each other.

In an embodiment, the auxiliary pixel circuit PCa and the auxiliary display element DEa may be connected to each other through an electrode connection line EWL. A portion of the electrode connection line EWL may extend in a ±y direction, and the other portion of the electrode connection line EWL may extend in a ±x direction.

In addition, the electrode connection line EWL may include a first electrode connection line and a second electrode connection line including different materials from each other. For example, the first electrode connection line may include a conductive material including molybdenum (Mo), aluminum (Al), copper (Cu), titanium (Ti), etc., and the second electrode connection line may include a transparent conductive material. This will be described later below with reference to FIGS. 6A and 6B.

Meanwhile, the component area CA may include a transmission area TA. The transmission area TA may be arranged to surround the auxiliary display elements DEa. In some embodiments, the transmission area TA may be arranged in a lattice shape with the auxiliary display elements DEa.

Because the component area CA has the transmission area TA, a resolution of the component area CA may be less than that of the main area MDA. For example, the resolution of the component area CA may be about 1/2, 3/8, 1/3, 1/4, 2/9, 1/8, 1/9, 1/12.25, 1/16, etc. that of the main area MDA. For example, the resolution of the main area MDA may be about 400 ppi or more, and the resolution of the component area CA may be about 200 ppi or about 100 ppi.

In FIG. 4, there is one component area CA, but a plurality of component areas CA may be provided. In this case, the plurality of component areas CA are spaced apart from each other, a first camera may be arranged to correspond to one component area CA, and a second camera may be arranged to correspond to another component area CA. In some embodiments, a camera may be arranged to correspond to one component area CA, and an infrared sensor may be arranged to correspond to another component area CA. Shapes and sizes of the component areas CA may be different from each other.

The component area CA may have a circular shape, an ellipse shape, a polygonal shape, or an amorphous shape. In some embodiments, the component area CA may be an octagon. The component area CA may have a polygonal shape of various forms, such as a quadrilateral shape, a hexagonal shape, and the like. The component area CA may be surrounded by the main area MDA.

The pixel circuits PC for driving the display elements DE may be respectively electrically connected to outer circuits arranged in the peripheral area PA. The first driving unit DU1, the second driving unit DU2, and a pad unit PAD may be arranged in the peripheral area PA. In addition, although not shown, a first power supply line and a second power supply line may also be arranged in the peripheral area PA.

The first driving unit DU1 may include a plurality of first gate driving circuits GDC1. The first gate driving circuits GDC1 may be respectively connected to gate lines GL each extending in a first direction (for example, a ±x direction). The second driving unit DU2 may include a plurality of second gate driving circuits GDC2. The second gate driving circuits GDC2 may be connected to the gate lines GL each extending in the first direction (for example, the ±x direction).

The gate lines GL may be connected to the main pixel circuits PCm connected to the main display elements DEm arranged in a same row and the auxiliary pixel circuits PCa connected to the auxiliary display elements DEa arranged in a same row. The gate lines GL may sequentially transmit electrical signals to the main pixel circuits PCm that are connected to the main display elements DEm located in a same row and the auxiliary pixel circuits PCa connected to the auxiliary display elements DEa in a same row.

In other words, the gate lines GL may be connected to the main pixel circuits PCm and the auxiliary pixel circuits PCa that are arranged in same row. The gate lines GL may sequentially transmit an electrical signal to the main pixel circuits PCm and the auxiliary pixel circuits PCa arranged in a same row.

For example, as shown in FIG. 4, a first auxiliary display element DEa1 and a second auxiliary display element DEa2 from among the auxiliary display elements DEa may be arranged in a same row. A third main display element DEm3 among the main display elements DEm may be arranged in a same row as the first auxiliary display element DEa1 and the second auxiliary display element DEa2. In this case, a first auxiliary pixel circuit PCa1 connected to the first auxiliary display element DEa1, a second auxiliary pixel circuit PCa2 connected to the second auxiliary display element DEa2, and a third main pixel circuit PCm3 connected to the third main display element DEm3 may be connected to a same first gate line GL1. The first gate line GL1 may extend in the first direction (for example, the ±x direction) and connect the first auxiliary pixel circuit PCa1, the second auxiliary pixel circuit PCa2, and the third main pixel circuit PCm3 to the first gate driving circuit GDC1.

In a comparative example, when an auxiliary pixel circuit is not arranged adjacent to a driving unit, a gate line bypasses a display area, thus increasing a length of the gate line. In this case, due to a length deviation between a gate line connected to the auxiliary pixel circuit and a gate line connected to a main pixel circuit, a transmission deviation of a gate signal may occur during a high-speed drive of the display apparatus.

However, when the auxiliary pixel circuits PCa are arranged between the display area DA and the first driving unit DU1, the gate line GL does not bypass the display area DA (or, part of the gate line does not extend in the ±y direction) and may be connected to the auxiliary pixel circuit PCa. In this case, the length deviation between the gate line GL connected to the auxiliary pixel circuit PCa and the gate line GL connected to the main pixel circuit PCm does not occur, thus preventing the occurrence of a transmission deviation of the gate signal during a high-speed drive of the display apparatus 1 (see FIG. 1).

In addition, when the auxiliary pixel circuits PCa are arranged between the display area DA and the first driving unit DU1, a dead area d at an upper end of the display panel 10 may be reduced.

Gate lines GL that extend in the first direction (for example, the ±x direction) in the component area CA from among the gate lines GL may be spaced apart from each other. In other words, the first gate line GL1 connected to the auxiliary pixel circuit PCa from among the gate lines GL and second gate lines GL2 respectively arranged in a same row as the first gate lines GL1 from among the gate lines GL may be spaced apart from each other.

For example, as shown in FIG. 4, the first gate line GL1 connecting the first auxiliary pixel circuit PCa1 to the first gate driving circuit GDC1 and the second gate line GL2 connected to the second gate driving circuit GDC2 may be spaced apart from each other by the component area CA. The first gate line GL1 and the second gate line GL2 may be spaced apart from each other in the first direction (for example, the ±x direction) by the component area CA. In this case, the first gate line GL1 and the second gate line GL2 may be arranged in a same row.

Unlike the above, third gate lines GL3 not connected to the auxiliary pixel circuit PCa from among the gate lines GL extend in the first direction (for example, the ±x direction) and may be connected to the first gate driving circuit GDC1 and the second gate driving circuit GDC2, respectively. The third gate line GL3 may not include a portion that is disconnected by the component area CA.

In FIG. 4, each of the gate lines GL includes one line, but each of the gate lines GL may include a plurality of lines. Each of the gate lines GL may include a scan line, an emission control line, etc.

Each of the first and second gate driving circuits GDC1 and GDC2 may include a scan driving circuit and an emission control driving circuit. The scan driving circuit included in each of the first and second gate driving circuits GDC1 and GDC2 may provide a scan signal to each of the pixel circuits PC through a scan line. In addition, the emission control driving circuit included in each of the first and second gate driving circuits GDC1 and GDC2 may provide an emission control signal to each of the pixel circuits PC through an emission control line.

The second driving unit DU2 may be arranged in parallel with the first driving unit DU1 with the display area DA therebetween. The pixel circuits PC arranged in the display area DA may be commonly connected to the first driving unit DU1 and the second driving unit DU2. In another embodiment, some of the pixel circuits PC arranged in the display area DA may be electrically connected to the first driving unit DU1, and other ones may be connected to the second driving unit DU2. In another embodiment, the second driving unit DU2 may be omitted.

The pad unit PAD may be arranged at one side of the substrate 100. The pad unit PAD may include main data pads DPm, auxiliary data pads DPa, clock pads, scan pads, etc. The pad unit PAD is exposed by not being covered with an insulating layer and may be connected to a printed circuit board PCB.

Main data lines DLm and auxiliary data lines DLa each extend in the second direction (for example, the ±y direction) and may be arranged between the first driving unit DU1 and the second driving unit DU2. The main data lines DLm may be connected to main pixel circuits PCm arranged in a same column from among the main pixel circuits PCm, and may be respectively connected to a corresponding main data pad DPm from among the main data pads DPm. The auxiliary data lines DLa may be connected to auxiliary pixel circuits PCa arranged in a same column from among the auxiliary pixel circuits PCa, and may be respectively connected to a corresponding auxiliary data pad DPa from among the auxiliary data pads DPa.

For example, as shown in FIG. 4, a first main data line DLm1 extends in the second direction (for example, the ±y direction) and may connect a first main data pad DPm1 to a first main pixel circuit PCm1. In this case, the first main data line DLm1 may be configured to transmit a first data signal to the first main pixel circuit PCm1. A second main data line DLm2 extends in the second direction (for example, the ±y direction) and may connect a second main data pad DPm2 to a second main pixel circuit PCm2. In this case, the second main data line DLm2 may be configured to transmit a second data signal to the second main pixel circuit PCm2. A third main data line DLm3 extends in the second direction (for example, the ±y direction) and may connect a third main data pad DPm3 to the third main pixel circuit PCm3. In this case, the third main data line DLm3 may be configured to transmit a third data signal to the third main pixel circuit PCm3.

In addition, a first auxiliary data line DLa1 extends in the second direction (for example, the ±y direction) and may connect a first auxiliary data pad DPa1 to the first auxiliary pixel circuit PCa1. In this case, the first auxiliary data line DLa1 may be configured to transmit the first data signal to the first auxiliary pixel circuit PCa1. As a result, the first auxiliary pixel circuit PCa1 and the first main pixel circuit PCm1 respectively connected to the first auxiliary display element DEa1 and a first main display element DEm1 arranged in a same column may receive a same first data signal.

Here, the first data signal may include a plurality of first data voltages. Each of the first data voltages may include voltages for implementing an image. The first data signal may be substantially synchronized with a clock signal to be described later below, and the first data voltages may respectively transmitted to the pixel circuits PC arranged in another row based on the clock signal. Accordingly, the first auxiliary pixel circuit PCa1 and the first main pixel circuit PCm1 arranged in different rows from each other may receive the first data voltage at different times.

Meanwhile, a third auxiliary display element DEa3 arranged in the component area CA may be arranged in a same column as the first auxiliary display element DEa1. A third auxiliary pixel circuit PCa3 may be arranged in a same column as the first auxiliary pixel circuit PCa1. The third auxiliary pixel circuit PCa3 connected to the third auxiliary display element DEa3 through the electrode connection line EWL may be connected to the first auxiliary data line DLa1. The third auxiliary pixel circuit PCa3 may receive the first data signal via the first auxiliary data line DLa1.

A second auxiliary data line DLa2 extends in the second direction (for example, the ±y direction) and may connect a second auxiliary data pad DPa2 to the second auxiliary pixel circuit PCa2. In this case, the second auxiliary data line DLa2 may be configured to transmit the second data signal to the second auxiliary pixel circuit PCa2. As a result, the second auxiliary pixel circuit PCa2 and the second main pixel circuit PCm2 respectively connected to the second auxiliary display element DEa2 and a second main display element DEm2 arranged in a same column may receive a same second data signal. Similar to the first data signal, the second data signal may include a plurality of second data voltages. Each of the second data voltages may include voltages for implementing an image, and may be transmitted to pixel circuits PC arranged in another row.

In an embodiment, a portion overlapping the main area MDA of the main data lines DLm extending in the second direction (for example, the ±y direction) in the component area CA from among the main data lines DLm may be shorter than that of the other main data lines DLm. In other words, a portion overlapping the main area MDA of the main data lines DLm electrically connected to the main display element DEm arranged in a same column as the auxiliary display element DEa from among the main data lines DLm may be shorter than that of the main data lines DLm.

For example, as shown in FIG. 4, a second portion €2 overlapping the main area MDA of the third main data line DLm3 may be longer than a first portion €1 overlapping the main area MDA of the first main data line DLm1. The first main data line DLm1 may extend in the second direction (for example, the ±y direction) in the component area CA. The first main data line DLm1 may be electrically connected to the first main display element DEm1, and the first main display element DEm1 may be arranged in a same column as the first auxiliary display element DEa1. It is described above based on the first main data line DLm1, but a same may be applied to the second main data line DLm2.

In FIG. 4, the main data pads DPm correspond to the main data lines DLm on a one-to-one basis, but the main data lines DLm may not correspond to the main data pads DPm on a one-to-one basis. For example, the main data lines DLm may be connected to main data pads DPm that are same as each other from among the main data pads DPm, through a multiplexer. It is described above based on the main data pad DPm, but a same may be applied to the auxiliary data pads DPa.

A clock pad is connected to the first gate driving circuits GDC1 and may transmit a clock signal to the first gate driving circuits GDC1. The first gate driving circuits GDC1 may sequentially output a gate signal to the gate lines GL based on the clock signal received from the clock pad. For example, each of the first gate driving circuits GDC1 is connected to a previous gate line and may receive a previous gate signal from the previous gate line. According to another example, each of the first gate driving circuits GDC1 is connected to a previous first gate driving circuit and may receive a previous control signal from the previous first gate driving circuit. Each of the first gate driving circuits GDC1 may be configured to generate a gate signal based on a previous control signal or a previous gate signal, and a clock signal. It is described above based on the first gate driving circuit GDC1, but a same may be applied to the second gate driving circuit GDC2.

The display apparatus 1 may include a printed circuit board PCB on which a display driving circuit DDC is mounted.

The printed circuit board PCB is mounted on a pad unit PU, and a terminal unit PCB-P of the printed circuit board PCB may be electrically connected to the pad unit PU of the display panel 10. The printed circuit board PCB includes lines for connecting to each of the main data pads DPm, the auxiliary data pads DPa, the clock pads, the scan pads, etc., and may transmit a signal or power of a controller to the display panel 10. The display driving circuit DDC mounted on the printed circuit board PCB will be described in detail below with reference to FIG. 5.

Figure 5:
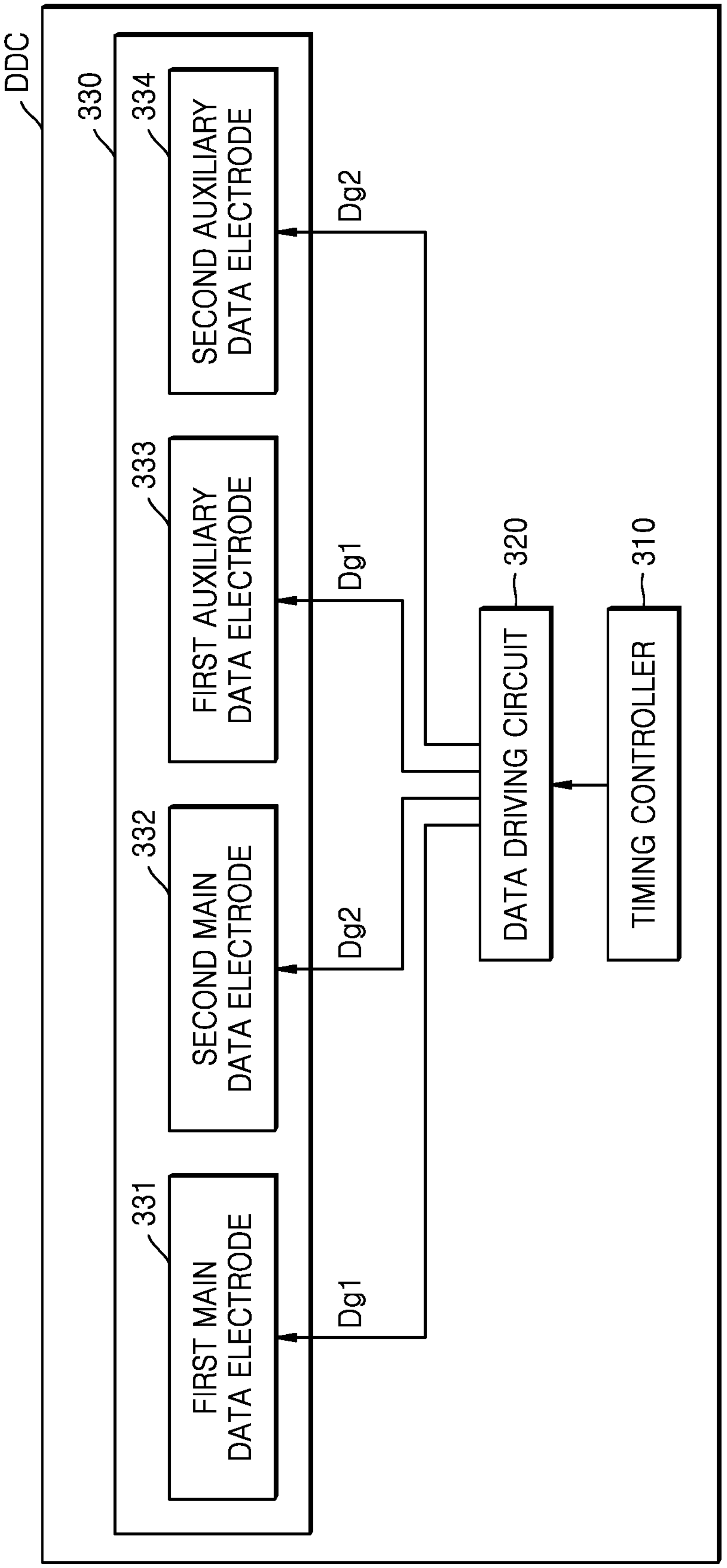
FIG. 5 is a block diagram schematically illustrating a display driving circuit according to an embodiment.

FIG. 5 is a block diagram schematically illustrating a display driving circuit DDC according to an embodiment.

Referring to FIG. 5, the display driving circuit DDC may include a timing controller (TCON) 310, a data driving circuit 320, and an electrode portion 330. In addition, the display driving circuit DDC may further include a clock signal output circuit, a gate signal output circuit, etc. The display driving circuit DDC may be formed as one semiconductor integrated circuit chip.

The electrode portion 330 may include a first main data electrode 331, a second main data electrode 332, a first auxiliary data electrode 333, and a second auxiliary data electrode 334 that are respectively connected to the first main data pad DPm1, the second main data pad DPm2, the first auxiliary data pad DPa1, and the second auxiliary data pad DPa2. In addition, although not shown in FIG. 5, the electrode portion 330 may further include a third main data electrode, clock electrodes, scan electrodes, etc.

The TCON 310 may generate various control signals for controlling a driving timing of the display panel 10. The TCON 310 may transmit image data to the data driving circuit 320. The data driving circuit 320 receives the image data from the TCON 310 and may generate a data voltage corresponding to the image data and transmit the generated data voltage to the display panel 10. In addition, the TCON 310 may control a gate signal output of the gate signal output circuit.

The TCON 310 may include a clock signal output circuit for outputting a clock signal to the clock electrode. The gate signal output circuit is synchronized with the clock signal and may be configured to sequentially transmit a gate signal to a scan electrode.

The data driving circuit 320 is synchronized with the clock signal and may be configured to output a first data signal Dg1 to the first main data electrode 331, output a second data signal Dg2 to the second main data electrode 332, output the first data signal Dg1 to the first auxiliary data electrode 333, and output the second data signal Dg2 to the second auxiliary data electrode 334.

Here, the first data signal Dg1 may include a plurality of first data voltages respectively corresponding to the image data received from the TCON 310. The first data voltages may be generated in the data driving circuit 320 as described above. It is described above with reference to the first data signal Dg1, but a same may be applied to the second data signal Dg2.

Figure 6A:
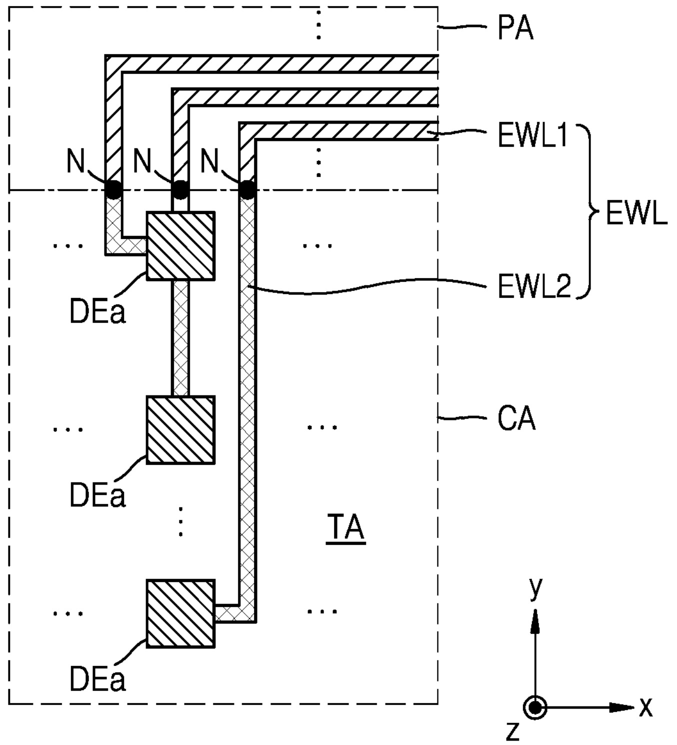
FIG. 6A is an enlarged plan view schematically illustrating part of a display panel according to an embodiment.
Figure 6B:
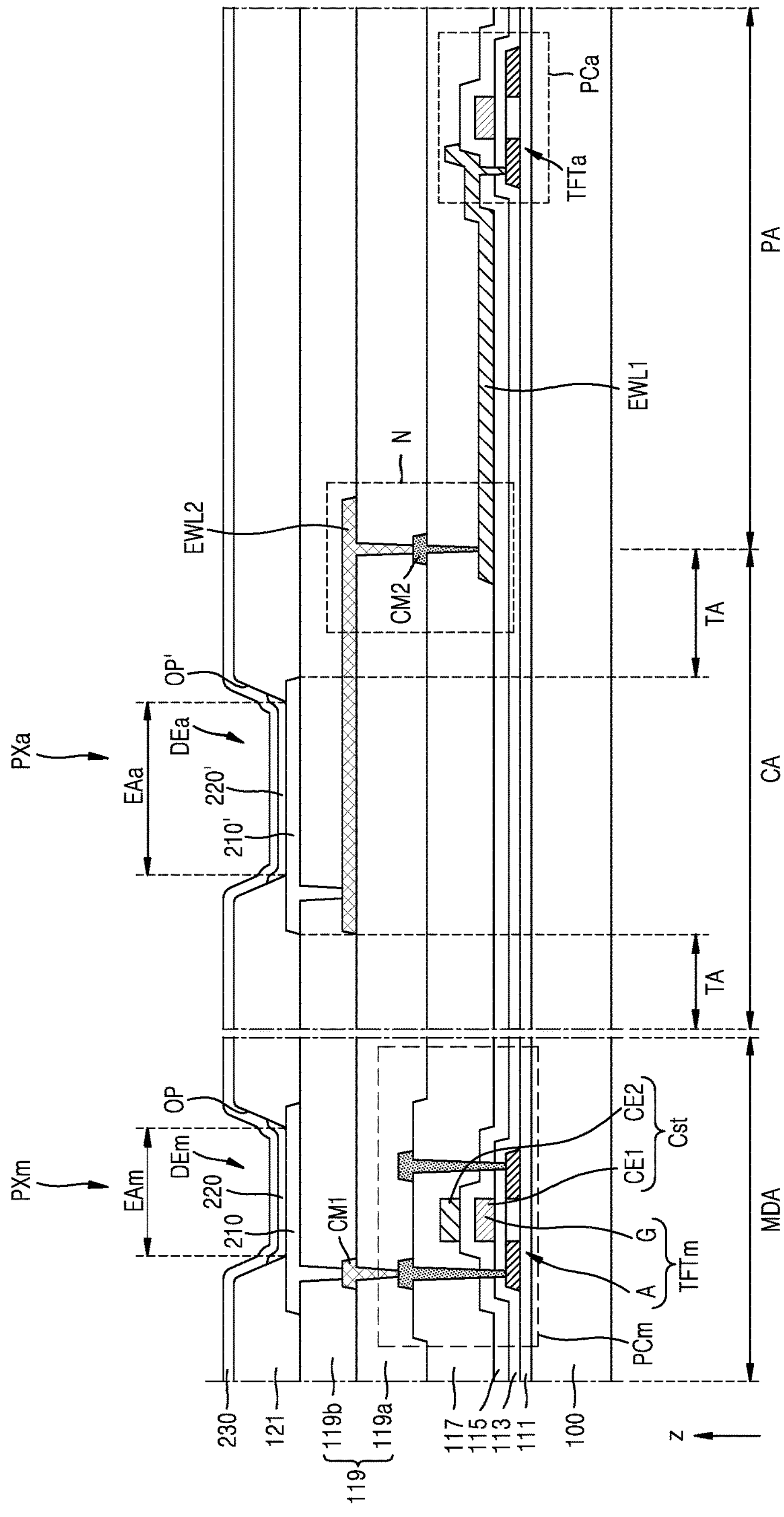
FIG. 6B is a cross-sectional view schematically illustrating a display panel according to an embodiment.

FIG. 6A is an enlarged plan view schematically illustrating part of a display panel according to an embodiment, and FIG. 6B is a cross-sectional view schematically illustrating a display panel according to an embodiment. Specifically, FIG. 6A shows a portion of a component area and a portion of a peripheral area therearound, in an enlarged view.

Referring to FIG. 6A, a plurality of auxiliary display elements DEa may be arranged in the component area CA. As described above with reference to FIG. 4, the auxiliary display elements DEa may be respectively connected to the auxiliary pixel circuits PCa arranged in the peripheral area PA. The auxiliary display elements DEa may be respectively connected to the auxiliary pixel circuits PCa through electrode connection lines EWL.

In an embodiment, each of the electrode connection lines EWL may include a first electrode connection line EWL1 and a second electrode connection line EWL2 including different materials from each other. In this case, the first electrode connection line EWL1 is arranged in the peripheral area PA and may include a conductive material. The second electrode connection line EWL2 is arranged in the component area CA and may include a transparent conductive oxide.

The first electrode connection line EWL1 and the second electrode connection line EWL2 may be connected to each other at a node N. In FIG. 4, the node N is located at a boundary between the component area CA and the peripheral area PA, but in another embodiment, the node N may be located in the peripheral area PA.

Hereinafter, elements included in the display panel 10 will be described with reference to FIG. 6B according to a stacked structure thereof, and a positional relationship of the first electrode connection line EWL1, the second electrode connection line EWL2, etc. will be described.

Referring to FIG. 6B, a main display element DEm may be arranged in a main area MDA, and an auxiliary display element DEa may be arranged in a component area CA. In addition, a main pixel circuit PCm including a main thin-film transistor TFTm may be arranged in the main area MDA. An auxiliary pixel circuit PCa including an auxiliary thin-film transistor TFTa may be arranged in a peripheral area PA. The main display element DEm may be connected to the main pixel circuit PCm, and may implement a main pixel PXm. The auxiliary display element DEa may be connected to the auxiliary pixel circuit PCa, and may implement an auxiliary pixel PXa.

A substrate 100 may include glass or a polymer resin. The polymer resin may include polyethersulfone, polyacrylate, polyetherimide, polyethylene naphthalate, PET, polyphenylene sulfide, polyarylate, PI, polycarbonate, cellulose acetate propionate, or the like. The substrate 100 including a polymer resin may be flexible, rollable, or bendable. The substrate 100 may have a multi-layer structure including a layer including the polymer resin described above, and an inorganic layer (not shown).

A buffer layer 111 may reduce or block the penetration of foreign materials, moisture or ambient air into a lower portion from the substrate 100 and provide a flat surface on the substrate 100. The buffer layer 111 may include an inorganic material, such as oxide or nitride, an organic material, or an organic and inorganic composite material, and may have a single-layer or multi-layer structure of an inorganic material and an organic layer.

A barrier layer (not shown) may be further arranged between the substrate 100 and the buffer layer 111. The barrier layer may prevent or minimize the penetration of impurities into a semiconductor layer A from the substrate 100, etc. The barrier layer may include an inorganic material such as an oxide or a nitride, an organic material, or an organic/inorganic composite material, and may have a single-layer or multi-layer structure including an inorganic material and an organic material.

The semiconductor layer A may be arranged on the buffer layer 111. The semiconductor layer A may include amorphous silicon or polysilicon. In another embodiment, the semiconductor layer A may include an oxide of at least one selected from the group consisting of indium (In), gallium (Ga), tin (Sn), zirconium (Zr), vanadium (V), hafnium (Hf), cadmium (Cd), germanium (Ge), chromium (Cr), titanium (Ti), aluminum (Al), cesium (Cs), cerium (Ce), and zinc (Zn).

The semiconductor layer A may include a channel area, a source area, and a drain area, the source area and the drain area being arranged at opposite sides of the channel area. The semiconductor layer A may include a single layer or multiple layers.

A first gate insulating layer 113 and a second gate insulating layer 115 may be stacked on the substrate 100 so that the semiconductor layer A is covered. Each of the first gate insulating layer 113 and the second gate insulating layer 115 may include silicon oxide ($SiO_2$), silicon nitride ($SiN_X$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnO).

A gate electrode G may be arranged on the first gate insulating layer 113 to at least partially overlap the semiconductor layer A. The gate electrode G includes molybdenum (Mo), aluminum (Al), copper (Cu), titanium (Ti), etc., and may include a single layer or multiple layers. For example, the gate electrode G may be a single Mo layer.

In FIG. 6B, the gate electrode G is arranged on an upper surface of the first gate insulating layer 113, but in another embodiment, the gate electrode G may be arranged on an upper surface of the second gate insulating layer 115.

In an embodiment, a storage capacitor Cst includes a lower electrode CE1 and an upper electrode CE2 and as shown in FIG. 6B, may overlap the main thin-film transistor TFTm. For example, the gate electrode G of the main thin-film transistor TFTm may perform functions as the lower electrode CE1 of the storage capacitor Cst. Unlike the above, the storage capacitor Cst may not overlap the main thin-film transistor TFTm and may be present separately.

The upper electrode CE2 of the storage capacitor Cst overlaps the lower electrode CE1 with the second gate insulating layer 115 therebetween and forms a capacitance.

In this case, the second gate insulating layer 115 may function as a dielectric layer of the storage capacitor Cst.

The upper electrode CE2 of the storage capacitor Cst and a first electrode connection line EWL1 may be arranged on the second gate insulating layer 115. Each of the upper electrode CE2 of the storage capacitor Cst and the first electrode connection line EWL1 may include a conductive material including Mo, Al, Cu, Ti, and/or the like, and may be formed as a single layer or multiple layers including the above conductive material.

An interlayer insulating layer 117 may be provided on the second gate insulating layer 115 so that the upper electrode CE2 of the storage capacitor Cst and the first electrode connection line EWL1 are covered. The interlayer insulating layer 117 may include silicon oxide ($SiO_2$), silicon nitride ($SiN_X$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnO).

A source electrode, a drain electrode, and a second connection electrode CM2 may be arranged on the interlayer insulating layer 117.

Each of the source electrode, the drain electrode, and the second connection electrode CM2 may include a conductive material including Mo, Al, Cu, Ti, and/or the like, and may include multiple layers and a single layer including the above material. For example, each of the source electrode, the drain electrode, and the second connection electrode CM2 may have a multi-layer structure of a Ti layer, an Al layer, and a Ti layer. The source electrode and the drain electrode may be connected to a source area and a drain area of the semiconductor layer A, respectively, through contact holes. The second connection electrode CM2 may be connected to the first electrode connection line EWL1 through a contact hole.

The source electrode, the drain electrode, and the second connection electrode CM2 may be covered with an inorganic protective layer (not shown). The inorganic protective layer may include a single layer or multiple layers including silicon nitride ($SiN_X$) and/or silicon oxide ($SiO_X$). The inorganic protective layer may be introduced to cover and protect some lines arranged on the interlayer insulating layer 117.

A planarization layer 119 covers the source electrode, the drain electrode, and the second connection electrode CM2, and includes a contact hole connecting the main thin-film transistor TFTm and a first pixel electrode 210.

The planarization layer 119 may include a single layer or multiple layers including an inorganic material and may provide a flat upper surface. The planarization layer 119 may include a general-purpose polymer, such as benzocyclobutene (BCB), PI, hexamethyldisiloxane (HMDSO), poly(methyl methacrylate) (PMMA), or polystyrene (PS), a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, and any blends thereof.

In an embodiment, as shown in FIG. 6B, the planarization layer 119 may include a first planarization layer 119*a* and a second planarization layer 119*b*.

A first connection electrode CM1 and the second electrode connection line EWL2 may be arranged on the first planarization layer 119*a*. The first connection electrode CM1 and/or the second electrode connection line EWL2 may include a transparent conductive material. For example, the first connection electrode CM1 and/or the second electrode connection line EWL2 may include a transparent conductive oxide (TCO). The first connection electrode CM1 and/or the second electrode connection line EWL2 may include a conductive oxide such as indium tin oxide (ITO), indium zinc oxide (IZO), zinc oxide (ZnO), indium oxide ($In_2O_3$), indium gallium oxide (IGO), or aluminum zinc oxide (AZO).

The first connection electrode CM1 may be connected to the source electrode or the drain electrode through a contact hole formed in the first planarization layer 119*a*. The second electrode connection line EWL2 may be connected to the second connection electrode CM2 through the contact hole formed in the first planarization layer 119*a*, and as a result, may be connected to the first electrode connection line EWL1. A point at which the first electrode connection line EWL1 and the second electrode connection line EWL2 are connected to each other through the second connection electrode CM2 may correspond to the node N shown in FIG. 6A.

As shown in FIG. 6B, the first electrode connection line EWL1 and the second electrode connection line EWL2 may be arranged on different layers from each other. In FIG. 6B, the first electrode connection line EWL1 is arranged on the second gate insulating layer 115, and the second electrode connection line EWL2 is arranged on the first electrode connection line EWL1, but this is only an example. In another example, the first electrode connection line EWL1 may be arranged on the first gate insulating layer 113, the interlayer insulating layer 117, or the first planarization layer 119*a*. The second electrode connection line EWL2 may be arranged on the interlayer insulating layer 117.

In another embodiment, the first electrode connection line EWL1 and the second electrode connection line EWL2 may be arranged on a same layer. For example, the first electrode connection line EWL1 and the second electrode connection line EWL2 may be arranged on the interlayer insulating layer 117 or the first planarization layer 119*a*. An end of the second electrode connection line EWL2 may cover an end of the first electrode connection line EWL1. Accordingly, the first electrode connection line EWL1 and the second electrode connection line EWL2 may be connected to each other.

The main display element DEm and the auxiliary display element DEa may be arranged on the planarization layer 119. Some areas that do not the auxiliary display element DEa from among the component area CA in which the auxiliary display element DEa is not arranged may correspond to a transmission area TA.

The main display element DEm may include the first pixel electrode 210, a first intermediate layer 220 including an inorganic emission layer, and an opposite electrode 230. The main display element DEm may be connected to the main display element DEm through contact holes formed in the planarization layer 119 and the first connection electrode CM1. In other words, the main display element DEm may be connected to the main pixel circuit PCm.

The auxiliary display element DEa may include a second pixel electrode 210', a second intermediate layer 220' including an organic emission layer, and the opposite electrode 230. The auxiliary display element DEa may be connected to the auxiliary thin-film transistor TFTa through contact holes formed in the planarization layer 119, the first electrode connection line EWL1, the second connection electrode CM2, and the second electrode connection line EWL2. In other words, the auxiliary display element DEa may be connected to the auxiliary pixel circuit PCa.

The first pixel electrode 210 may include a (semi)light-transmitting electrode or a reflective electrode. In some embodiments, the first pixel electrode 210 may include a reflective layer including silver (Ag), magnesium (Mg), Al, platinum (Pt), palladium (Pd), gold (Au), nickel (Ni), neodymium (Nd), iridium (Jr), chrome (Cr), and any compounds thereof, and a transparent or translucent electrode layer formed on the reflective layer. The transparent or translucent electrode layer may include at least one selected from the group consisting of indium tin oxide (ITO), indium zinc oxide (IZO), zinc oxide (ZnO), indium oxide ($In_2O_3$), indium gallium oxide (IGO), and aluminum zinc oxide (AZO). In some embodiments, the first pixel electrode 210 may have a structure of an ITO layer, an Ag layer, and another ITO layer. It is described above based on the first pixel electrode 210, but a same may be applied to the second pixel electrode 210'.

In the display area DA of the substrate 100, a pixel-defining layer 121 may be arranged on the planarization layer 119. The pixel-defining layer 121 covers an edge of the first pixel electrode 210 and may include a first opening OP that exposes a central portion of the first pixel electrode 210. An emission area EAm of the main display element DEm is defined by the first opening OP. The pixel-defining layer 121 covers an edge of the second pixel electrode 210' and may include a second opening OP' that exposes a central portion of the second pixel electrode 210'. An emission area EAa of the auxiliary display element DEa is defined by the second opening OP'.

In an embodiment, when the main display element DEm and the auxiliary display element DEa emit light of a same color, the emission area EAm of the main display element DEm may be smaller than the emission area EAa of the auxiliary display element DEa. In other words, when sizes of the main pixel PXm and the auxiliary pixel PXa emitting light of a same color are compared with each other, the size of the auxiliary pixel PXa may be greater than the size of the main pixel PXm.

The pixel-defining layer 121 may increase a distance between the edge of the first pixel electrode 210 and the opposite electrode 230 above the first pixel electrode 210 to thereby prevent an arc or the like from occurring at the edge of the first pixel electrode 210. It is described above based on the first pixel electrode 210, but a same may be applied to the second pixel electrode 210'.

The pixel-defining layer 121 may include at least one organic insulating material selected from the group consisting of PI, polyamide, an acrylic resin, BCB, and a phenol resin and may be formed by spin coating or the like.

The first intermediate layer 220 is arranged in the first opening OP formed by the pixel-defining layer 121 and may include an organic emission layer. The organic emission layer may include an organic material including a fluorescent or phosphorescent material that emits red, green, blue, or white light. The organic emission layer may include a low-molecular weight organic material or a polymer organic material, and functional layers such as a hole transport layer (HTL), a hole injection layer (HIL), an electron transport layer (ETL), and an electron injection layer (EIL) may be optionally further included below and above the organic emission layer. It is described above based on the first intermediate layer 220, but a same may be applied to the second intermediate layer 220'.

The opposite electrode 230 may include a light-transmitting electrode or a reflective electrode. In some embodiments, the opposite electrode 230 may include a transparent or translucent electrode, and may include a metal thin film that has a low work function and includes Li, Ca, LiF/Ca, LiF/Al, Al, Ag, Mg, or any compounds thereof. Also, a TCO layer including ITO, IZO, ZnO, or $In_2O_3$ may be further arranged on the metal thin film. The opposite electrode 230 is arranged throughout the display area DA and may be arranged above the first intermediate layer 220, the second intermediate layer 220', and the pixel-defining layer 121. The opposite electrode 230 is integrally formed as a single body with a plurality of organic light-emitting diodes OLED and may correspond to a plurality of first pixel electrodes 210 and a plurality of second pixel electrodes 210'.

The organic light-emitting diode OLED may be easily damaged by moisture, oxygen, and the like from the outside, and thus, an encapsulation layer (not shown) may cover and protect the organic light-emitting diode OLED. The encapsulation layer may cover the display area DA and extend to at least part of the peripheral area PA. The encapsulation layer may include a first inorganic encapsulation layer, an organic encapsulation layer, and a second inorganic encapsulation layer.

Figure 7:
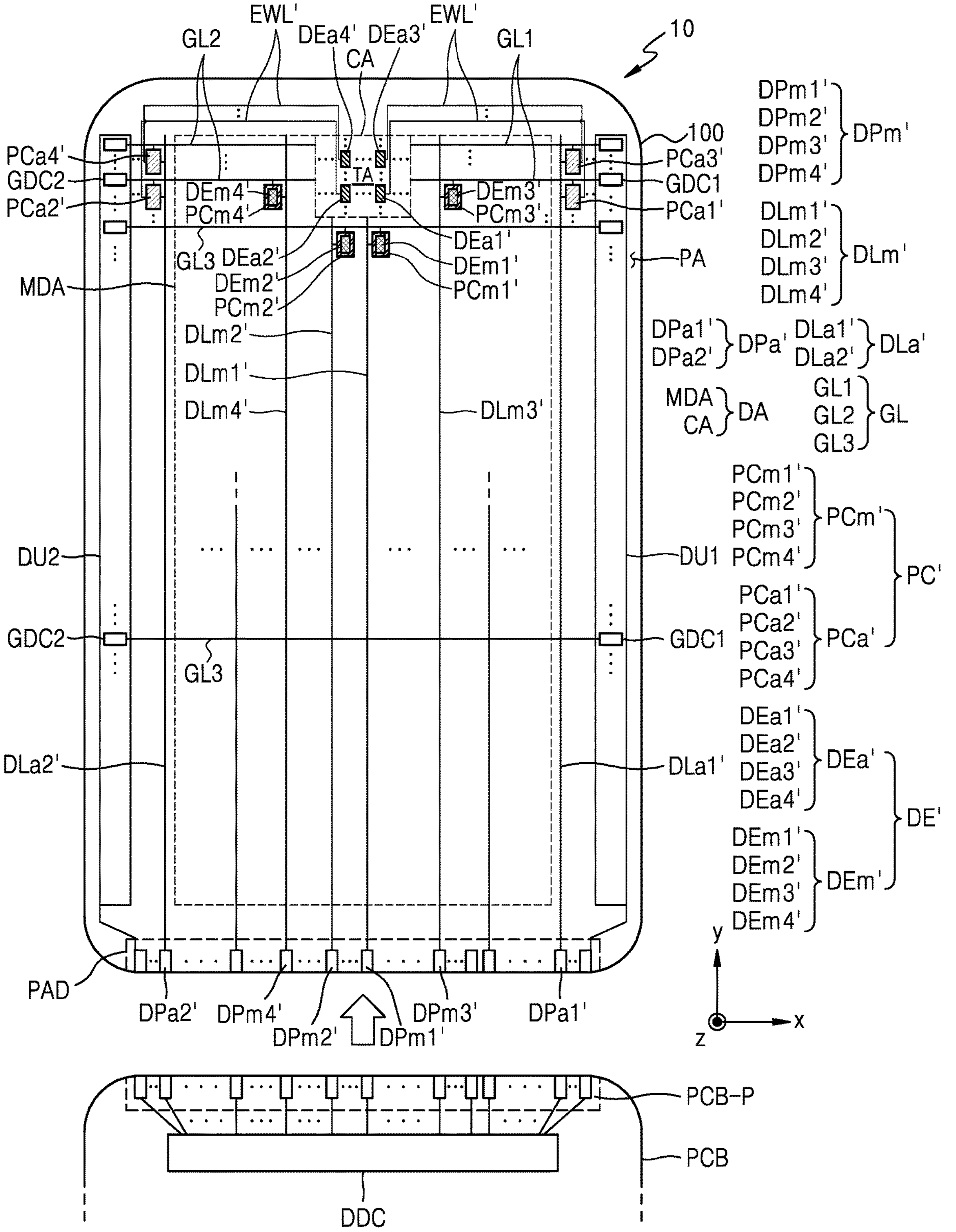
FIG. 7 is a plan view schematically illustrating a display apparatus according to another embodiment.

FIG. 7 is a plan view schematically illustrating a display apparatus according to another embodiment. FIG. 7 is a modification of the embodiment of FIG. 4, differing in a structure of an auxiliary pixel circuit. Same descriptions as those of FIG. 4 will be omitted, and only differences will be described.

Referring to FIG. 7, a plurality of main pixel circuits PCm' and a plurality of main display elements DEm' may be arranged in the main area MDA. A plurality of auxiliary display elements DEa' may be arranged in the component area CA, and a plurality of auxiliary pixel circuits PCa' may be arranged in the peripheral area PA. The auxiliary display elements DEa' may be connected to the auxiliary pixel circuits PCa', respectively, through an electrode connection line EWL'.

In FIG. 7, unlike FIG. 4, the auxiliary pixel circuit PCa' is arranged between the second driving unit DU2 and the display area DA. In other words, the display area DA may be located between a first auxiliary pixel circuit PCa1' and a second auxiliary pixel circuit PCa2'. In this case, some of the auxiliary display elements DEa' arranged in the component area CA are respectively connected to the auxiliary pixel circuits PCa' arranged between the first driving unit DU1 and the display area DA, and other ones may be respectively connected to the auxiliary pixel circuits PCa' arranged between the second driving unit DU2 and the display area DA.

Pixel circuits PC' driving display elements DE' may be respectively electrically connected to outer circuits arranged in the peripheral area PA. The first driving unit DU1, the second driving unit DU2, and a pad unit PAD may be arranged in the peripheral area PA.

The gate lines GL may be respectively connected to the main pixel circuits PCm' connected to the main display elements DEm' located in a same row, and the auxiliary pixel circuits PCa' connected to the auxiliary display elements DEa' located in a same row.

For example, as shown in FIG. 7, a first auxiliary display element DEa1' and a third main display element DEm3' may be arranged in a same row. In this case, the first auxiliary pixel circuit PCa1' connected to the first auxiliary display element DEa1' and a third main pixel circuit PCm3' connected to the third main display element DEm3' may be connected to the same first gate line GL1. The first gate line GL1 extends in the first direction (for example, the ±x direction) and may connect the first auxiliary pixel circuit PCa1' and the third main pixel circuit PCm3' to the first gate driving circuits GDC1.

A second auxiliary display element DEa2' and a fourth main display element DEm4' may be arranged in a same row. In this case, the second auxiliary pixel circuit PCa2' connected to the second auxiliary display element DEa2' and a fourth main pixel circuit PCm4' connected to the fourth main display element DEm4' may be connected to the same second gate line GL2. The second gate line GL2 extends in the first direction (for example, the ±x direction) and may connect the second auxiliary pixel circuit PCa2' and the fourth main pixel circuit PCm4' to the second gate driving circuits GDC2.

In an embodiment, the first gate line GL1 connecting the first auxiliary pixel circuit PCa1' to the first gate driving circuit GDC1 and the second gate line GL2 connecting the second auxiliary pixel circuit PCa2' to the second gate driving circuit GDC2 may be spaced apart from each other. The first gate line GL1 and the second gate line GL2 may be spaced apart from each other in the first direction (for example, the ±x direction) by the component area CA. In this case, the first gate line GL1 and the second gate line GL2 may be arranged in a same row.

The pad unit PAD may be arranged at one side of the substrate 100. The pad unit PAD may include main data pads DPm', auxiliary data pads DPa', clock pads, scan pads, etc. The pad unit PAD is exposed by not being covered with an insulating layer and may be connected to the printed circuit board PCB.

Main data lines DLm' and auxiliary data lines DLa' each extend in the second direction (for example, the ±y direction) and may be arranged between the first driving unit DU1 and the second driving unit DU2. The main data lines DLm' may be connected to main pixel circuits PCm' located in a same column from among the main pixel circuits PCm', and may be connected to corresponding main data pads DPm' from among the main data pads DPm'. The auxiliary data lines DLa' may be connected to auxiliary pixel circuits PCa' located in a same column from among the auxiliary pixel circuits PCa', and may be connected to corresponding auxiliary data pads DPa' from among the auxiliary data pads DPa'.

For example, as shown in FIG. 7, a first main data line DLm1' extends in the second direction (for example, the ±y direction) and may connect a first main data pad DPm1' to a first main pixel circuit PCm1'. In this case, the first main data line DLm1' may be configured to transmit the first data signal to the first main pixel circuit PCm1'. A second main data line DLm2' extends in the second direction (for example, the ±y direction) and may connect a second main data pad DPm2' to a second main pixel circuit PCm2'. In this case, the second main data line DLm2' may be configured to transmit the second data signal to the second main pixel circuit PCm2'. A third main data line DLm3' extends in the second direction (for example, the ±y direction) and may connect a third main data pad DPm3' to the third main pixel circuit PCm3'. In this case, the third main data line DLm3' may be configured to transmit the third data signal to the third main pixel circuit PCm3'. A fourth main data line DLm4' extends in the second direction (for example, the ±y direction) and may connect a fourth main data pad DPm4' to the fourth main pixel circuit PCm4'. In this case, the fourth main data line DLm4' may be configured to transmit a fourth data signal to the fourth main pixel circuit PCm4'.

In addition, a first auxiliary data line DLa1' extends in the second direction (for example, the ±y direction) and may connect a first auxiliary data pad DPa1' to the first auxiliary pixel circuit PCa1'. In this case, the first auxiliary data line DLa1' may be configured to transmit the first data signal to the first auxiliary pixel circuit PCa1'. As a result, the first auxiliary pixel circuit PCa1' and the first main pixel circuit PCm1' respectively connected to the first auxiliary display element DEa1' and a first main display element DEm1' arranged in a same column may receive the same first data signal.

A second auxiliary data line DLa2' extends in the second direction (for example, the ±y direction) and may connect a second auxiliary data pad DPa2' to the second auxiliary pixel circuit PCa2'. In this case, the second auxiliary data line DLa2' may be configured to transmit the second data signal to the second auxiliary pixel circuit PCa2'. As a result, the second auxiliary pixel circuit PCa2' and the second main pixel circuit PCm2' respectively connected to the second auxiliary display element DEa2' and a second main display element DEm2' may receive the same second data signal.

Meanwhile, a third auxiliary display element DEa3' arranged in the component area CA may be arranged in a same column as the first auxiliary display element DEa1'. A third auxiliary pixel circuit PCa3' may be arranged in a same column as the first auxiliary pixel circuit PCa1'. The third auxiliary pixel circuit PCa3' connected to the third auxiliary display element DEa3' through the electrode connection line EWL' may be connected to the first auxiliary data line DLa1'. The third auxiliary pixel circuit PCa3' may receive the first data signal via the first auxiliary data line DLa1'.

In addition, a fourth auxiliary display element DEa4' arranged in the component area CA may be arranged in a same column as the second auxiliary display element DEa2'. A fourth auxiliary pixel circuit PCa4' may be arranged in a same column as the second auxiliary pixel circuit PCa2'. The fourth auxiliary pixel circuit PCa4' connected to the fourth auxiliary display element DEa4' through the electrode connection line EWL' may be connected to the second auxiliary data line DLa2'. The fourth auxiliary pixel circuit PCa4' may receive the second data signal via the second auxiliary data line DLa2'.

Figure 8:
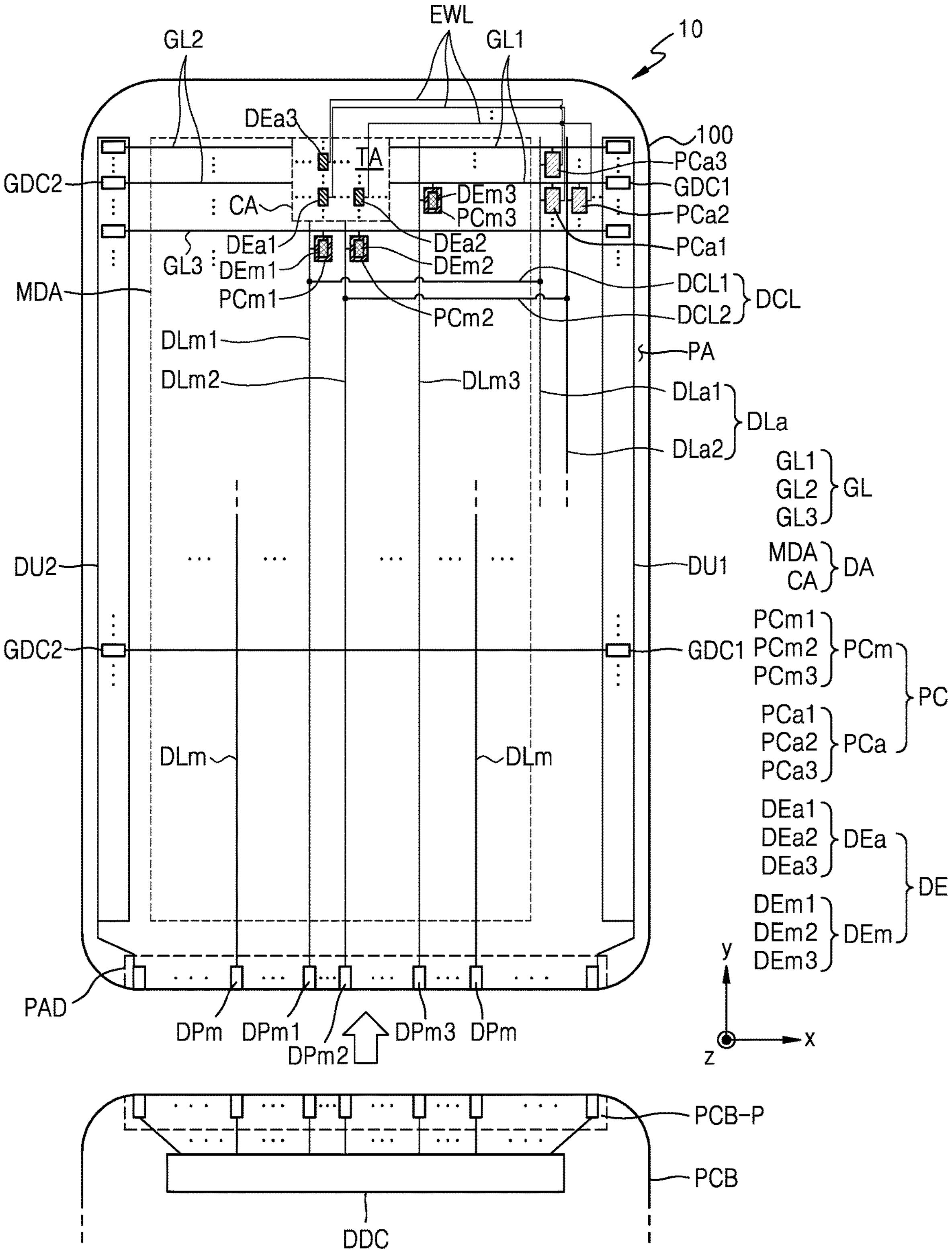
FIG. 8 is a plan view schematically illustrating a display apparatus according to another embodiment.

FIG. 8 is a plan view schematically illustrating a display apparatus according to another embodiment. FIG. 8 is a modification of the embodiment of FIG. 4, differing in a structure of an auxiliary pixel circuit. Same descriptions as those of FIG. 4 will be omitted, and only differences will be described.

Referring to FIG. 8, unlike the display panel 10 shown in FIG. 4, the auxiliary data pads DPa of the pad unit PAD may be omitted. Instead, the display panel 10 may include a data connection line DCL. The data connection line DCL may connect the main data line DLm and the auxiliary data line DLa to each other.

For example, the first main data line DLm1 and the first main data line DLm1 may be connected to each other through a first data connection line DCL1. In this case, the first auxiliary data line DLa1 may be configured to transmit the first data signal to the first auxiliary pixel circuit PCa1 through the first main data line DLm1 and the first data connection line DCL1.

Similarly, the second main data line DLm2 and the second auxiliary data line DLa2 may be connected to each other through a second data connection line DCL2. In this case, the second auxiliary data line DLa2 may transmit the second data signal to the second auxiliary pixel circuit PCa2 through the second main data line DLm2 and the second data connection line DCL2.

In an embodiment, the data connection line DCL may be arranged on the first gate insulating layer 113, the second gate insulating layer 115, the interlayer insulating layer 117, or the first planarization layer 119*a* shown in FIG. 6B.

Figure 9:
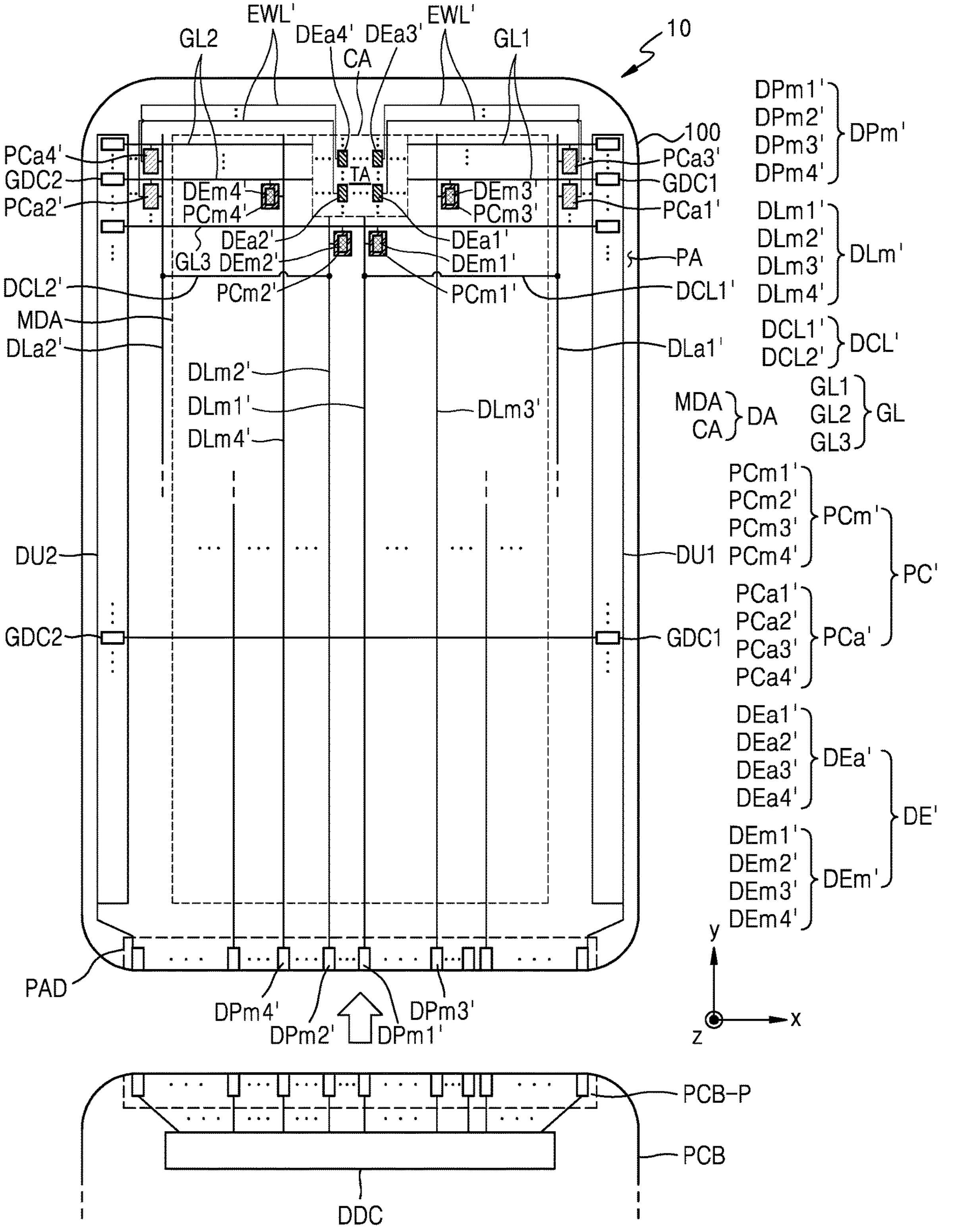
FIG. 9 is a plan view schematically illustrating a display apparatus according to another embodiment.

FIG. 9 is a plan view schematically illustrating a display apparatus according to another embodiment. FIG. 9 is a modification of the embodiment of FIG. 7, differing in a structure of an auxiliary pixel circuit. Same descriptions as those of FIG. 7 will be omitted, and only differences will be described.

Referring to FIG. 9, unlike the display panel 10 shown in FIG. 7, the auxiliary data pad DPa' of the pad unit PAD may be omitted. Instead, the display panel 10 may include a data connection line DCL'. The data connection line DCL' may connect the main data line DLm' and the auxiliary data line DLa' to each other.

For example, the first main data line DLm1' and the first auxiliary data line DLa1' may be connected to each other through a first data connection line DCL1'. In this case, the first auxiliary data line DLa1' may transmit the first data signal to the first auxiliary pixel circuit PCa1' through the first main data line DLm1' and the first data connection line DCL1'.

Similarly, the second main data line DLm2' and the second auxiliary data line DLa2' may be connected to each other through a second data connection line DCL2'. In this case, the second auxiliary data line DLa2' may transmit the second data signal to the second auxiliary pixel circuit PCa2' through the second main data line DLm2' and the second data connection line DCL2'.

In an embodiment, the data connection line DCL' may be arranged on the first gate insulating layer 113, the second gate insulating layer 115, the interlayer insulating layer 117, or the first planarization layer 119*a* shown in FIG. 6B.

A display panel and a display apparatus are mainly described above, but the present disclosure is not limited thereto. For example, a method of manufacturing the display panel and a method of manufacturing the display apparatus also fall within the scope of the present disclosure.

According to an embodiment configured as described above, a pixel circuit is not arranged in a component area, and thus, a wider transmission area may be obtained, and a display panel with improved transmittance and a display apparatus including the display panel may be implemented. However, the scope of the inventive concepts is not limited by this effect.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display panel comprising:

a substrate comprising a display area including a component area and a main area at least partially surrounding the component area, and a peripheral area disposed outside the display area;

a first main pixel circuit disposed in the main area;

a first main display element arranged in the main area and electrically connected to the first main pixel circuit;

a first auxiliary pixel circuit disposed in the peripheral area and arranged in a same row as the first main pixel circuit;

a first auxiliary display element arranged in the component area, electrically connected to the first auxiliary pixel circuit, and arranged in a same row as the first main display element;

a second auxiliary pixel circuit disposed in the peripheral area and arranged in the same row as the first auxiliary pixel circuit and the first main pixel circuit;

a second auxiliary display element arranged in the component area, electrically connected to the second auxiliary pixel circuit, and arranged in the same row as the first auxiliary display element and the first main display element;

a first gate driving circuit disposed in the peripheral area and on a same side of the display area as the first auxiliary pixel circuit; and a first gate line extending in a first direction and connecting the first main pixel circuit and the first auxiliary pixel circuit to the first gate driving circuit, wherein the first auxiliary pixel circuit is arranged between the display area and the first gate driving circuit.

2. The display panel of claim 1, further comprising:

a second main pixel circuit disposed in the main area;

a second main display element arranged in the main area and electrically connected to the second main pixel circuit;

a third auxiliary pixel circuit disposed in the peripheral area;

a third auxiliary display element arranged in the component area, electrically connected to the third auxiliary pixel circuit, and arranged in a same row as the second main display element;

a second gate driving circuit disposed in the peripheral area; and a second gate line extending in the first direction and connecting the second main pixel circuit and the third auxiliary pixel circuit to the second gate driving circuit, wherein:

the display area is located between the first gate driving circuit and the second gate driving circuit; and the third auxiliary pixel circuit is arranged between the display area and the second gate driving circuit.

3. The display panel of claim 2, wherein the first gate line and the second gate line arranged in a same row are spaced apart from each other in the first direction by the component area.

4. The display panel of claim 2, further comprising:

a third main pixel circuit and a fourth main pixel circuit disposed in the main area;

a third main display element arranged in the main area, electrically connected to the third main pixel circuit, and arranged in a same column as the first auxiliary display element;

a fourth main display element arranged in the main area, electrically connected to the fourth main pixel circuit, and arranged in a same column as the third auxiliary display element;

a first main data line and a second main data line connected to the third main pixel circuit and the fourth main pixel circuit, respectively;

a first auxiliary data line and a second auxiliary data line connected to the first auxiliary pixel circuit and the third auxiliary pixel circuit, respectively;

a first data connection line connecting the first main data line and the first auxiliary data line to each other; and a second data connection line connecting the second main data line and the second auxiliary data line to each other.

5. The display panel of claim 1, wherein the first auxiliary pixel circuit is spaced apart from the first auxiliary display element by the first main display element and a first main pixel circuit element.

6. The display panel of claim 1, wherein the first gate driving circuit is disposed on a same side of the display area as the first auxiliary pixel circuit and the second auxiliary pixel circuit.

7. The display panel of claim 1, wherein the first gate line connects the first main pixel circuit, the first auxiliary pixel circuit and the second auxiliary pixel circuit to the first gate driving circuit.

8. The display panel of claim 1, wherein the first auxiliary pixel circuit and the second auxiliary pixel circuit are disposed on the same side of the display area as the first gate driving circuit.

9. The display panel of claim 1, further comprising:

a third main pixel circuit and a fourth main pixel circuit disposed in the main area;

a third main display element arranged in the main area, electrically connected to the third main pixel circuit, and arranged in a same column as the first auxiliary display element;

a fourth main display element arranged in the main area, electrically connected to the fourth main pixel circuit, and arranged in a same column as the second auxiliary display element;

a first main data line and a second main data line connected to the third main pixel circuit and the fourth main pixel circuit, respectively;

a first auxiliary data line and a second auxiliary data line connected to the first auxiliary pixel circuit and the second auxiliary pixel circuit, respectively;

a first data connection line connecting the first main data line and the first auxiliary data line to each other; and a second data connection line connecting the second main data line and the second auxiliary data line to each other.

* * * * *